US009413620B2

(12) United States Patent  
Simpson et al.

(10) Patent No.: US 9,413,620 B2
(45) Date of Patent: Aug. 9, 2016

(54) ASSOCIATING A DATA COLLECTOR WITH A NETWORK ACCOUNT

(75) Inventors: Shell S. Simpson, Boise, ID (US); Glade William Diviney, Corvallis, OR (US); Ted Beers, Corvallis, OR (US); Mark A. Harper, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 105 days.

(21) Appl. No.: 14/373,734

(22) PCT Filed: Apr. 27, 2012

(86) PCT No.: PCT/US2012/035519
§ 371 (c)(1),
(2), (4) Date: Jul. 22, 2014

(87) PCT Pub. No.: WO2013/162602
PCT Pub. Date: Oct. 31, 2013

(65) Prior Publication Data
US 2015/0134813 A1    May 14, 2015

(51) Int. Cl.
*G06F 15/173* (2006.01)
*H04L 12/26* (2006.01)
*H04L 12/24* (2006.01)
*G06F 11/10* (2006.01)
*G06F 3/12* (2006.01)

(52) U.S. Cl.
CPC ............ *H04L 43/04* (2013.01); *G06F 11/1004* (2013.01); *H04L 41/5061* (2013.01); *G06F 3/1203* (2013.01); *G06F 3/1225* (2013.01); *G06F 3/1273* (2013.01); *G06F 3/1289* (2013.01)

(58) Field of Classification Search
USPC .................................................. 709/223–224
See application file for complete search history.

(56) References Cited

U.S. PATENT DOCUMENTS

| 6,957,921 | B1 | 10/2005 | Silverbrook et al. |
| 6,982,802 | B2 | 1/2006 | Borg et al. |
| 7,451,200 | B2 | 11/2008 | Metz |
| 7,739,198 | B2 | 6/2010 | Adkins et al. |
| 7,809,799 | B2 | 10/2010 | Littlefield |
| 8,073,123 | B2 | 12/2011 | Mamakos |
| 8,087,068 | B1 * | 12/2011 | Downey ................ H04L 63/083 726/4 |

(Continued)

FOREIGN PATENT DOCUMENTS

AU        762253 B2     6/2003

OTHER PUBLICATIONS

HP Rewards Program, (Web Page), found at http://h20423.www2.hp.com/program/rewards/in/en/index.asp, Apr. 16, 2012.

(Continued)

*Primary Examiner* — Philip B Tran
(74) *Attorney, Agent, or Firm* — HP Inc. Patent Department

(57) ABSTRACT

A system (100) for associating a data collector (FIG. 2, 340-2) with a network account comprises a first computing device (FIG. 1, 115) to collect data associated with the use of a number of object devices (110-1, 110-2, 110-n) on a network, in which the first computing device creates a network account associated with a second computing device (FIG. 1, 105), and in which the system (100) assigns a filename (FIG. 12, 1205) to a data collector data packet (FIG. 2, 340-2), the filename (FIG. 12, 1205) comprising information related to the network account associated with the second computing device (FIG. 1, 105).

18 Claims, 20 Drawing Sheets

(56) References Cited

U.S. PATENT DOCUMENTS

| | | |
|---|---|---|
| 2003/0005100 A1 | 1/2003 | Barnard et al. |
| 2003/0065564 A1 | 4/2003 | Carroll et al. |
| 2003/0236871 A1 | 12/2003 | Thurlow |
| 2004/0141487 A1 | 7/2004 | Lee |
| 2008/0037057 A1 | 2/2008 | Caffary |
| 2008/0172459 A1* | 7/2008 | Cross ............ H04L 12/58 709/204 |
| 2010/0082777 A1* | 4/2010 | Montgomery ...... H04L 51/28 709/220 |
| 2010/0171973 A1 | 7/2010 | Kimura |
| 2011/0060660 A1 | 3/2011 | Bhambri et al. |
| 2011/0107396 A1 | 5/2011 | Ozaki |
| 2011/0188070 A1 | 8/2011 | Pala et al. |
| 2011/0222104 A1 | 9/2011 | Mohammad et al. |
| 2011/0246679 A1 | 10/2011 | Sretenovic |
| 2012/0072595 A1 | 3/2012 | Laurent et al. |

OTHER PUBLICATIONS

International Search Report & Written Opinion received in PCT Application No. PCT/US2012/035519, Nov. 23, 2012, 9 pages.

Lin. J. et al., "Integrating Mobile Agent and Context-aware Workflow Analysis for M-commerce Applications," (Research Paper), Proceedings of the 2010 International Conference on e-Business (ICE-B), Jul. 26-28, 2010, pp. 1-7.

Xerox eConcierge Supplies Assistant, (Research Paper), 2011, found at http://www.office.xerox.com/latest/XDEFS-01.

* cited by examiner companyx.supersmartorder.com /awesomeness

Super Smart Order System

Are You Ready to Save Some Serious Time and Hassle?

Introducing Super Smart Order (SSO)... The easiest way to make sure your printer has the cartridges it needs. SSO watches over your printers and automatically updates a shopping list of printer cartridges so you can get printer cartridges at your convenience – not someone else's deadline!

SSO is simple and only takes five minutes to setup. Simply provide your email address and we'll send you simple instructions for installing the printer monitoring software and setting your preferences. After that, SSO will periodically send you your Shopping List, which you can print or easily use to shop online.

So what are you waiting for? Let's get started!

*Type Your Email Address Here* — 705

We won't share your email with anyone else!

Sign me up! — 710

ASSOCIATING A DATA COLLECTOR WITH A NETWORK ACCOUNT

BACKGROUND

Producers of goods and services often find it helpful to understand customer needs in order to develop products that fulfill these customer needs. Some information that a manufacturer may desire regarding a customer's needs include, for example, how the customer is using the product, how often the customer is using the product, what the customer likes or dislikes about the product, and what the manufacturer can do with future products to satisfy the customer's needs. From this data, the manufacturer can tailor future products to better fit the customer's needs.

Although this information can be of great value to a manufacturer, collecting this information can place a burden on the customer because of the time it takes to implement, for example, a data collection service. Specifically, regarding the manufacture and sale of printing devices and collection of data therefrom, a user may not wish to download and install a data collection file.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 7 is a screen shot of an introductory web page presented to a user in response to the user's selection of a hyperlink within the email of FIG. 6, according to an example of the principles described herein.

Throughout the drawings, identical reference numbers designate similar, but not necessarily identical, elements.

DETAILED DESCRIPTION

The systems and methods described herein comprise associating a data collector with a network account. A first computing device such as, for example, a server, collects data associated with the use of a number of object devices on a network. The first computing device creates a network account associated with a second computing device such as, for example, a user's computing device. The system assigns a filename to a data collector data packet where the filename comprises information related to the network account associated with the second computing device.

As used in the present specification and in the appended claims, the term "network" is meant to be understood broadly as two or more computing devices communicatively coupled to exchanging data. Some examples of networks include a local area network (LAN), a wide area network (WAN), a personal area network (PAN), a metropolitan area network (MAN), a campus area network (CAN), the Internet, a wireless network, a wired network, a home network, a storage area network (SAN), a virtual private network (VPN), a network that delivers requested virtual resources as a service, and combinations thereof, among others.

As used in the present specification and in the appended claims, the term "executable file" is meant to be understood broadly as a data file that contains programs or commands that, when executed by a processor, performs operations on actions to be taken.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
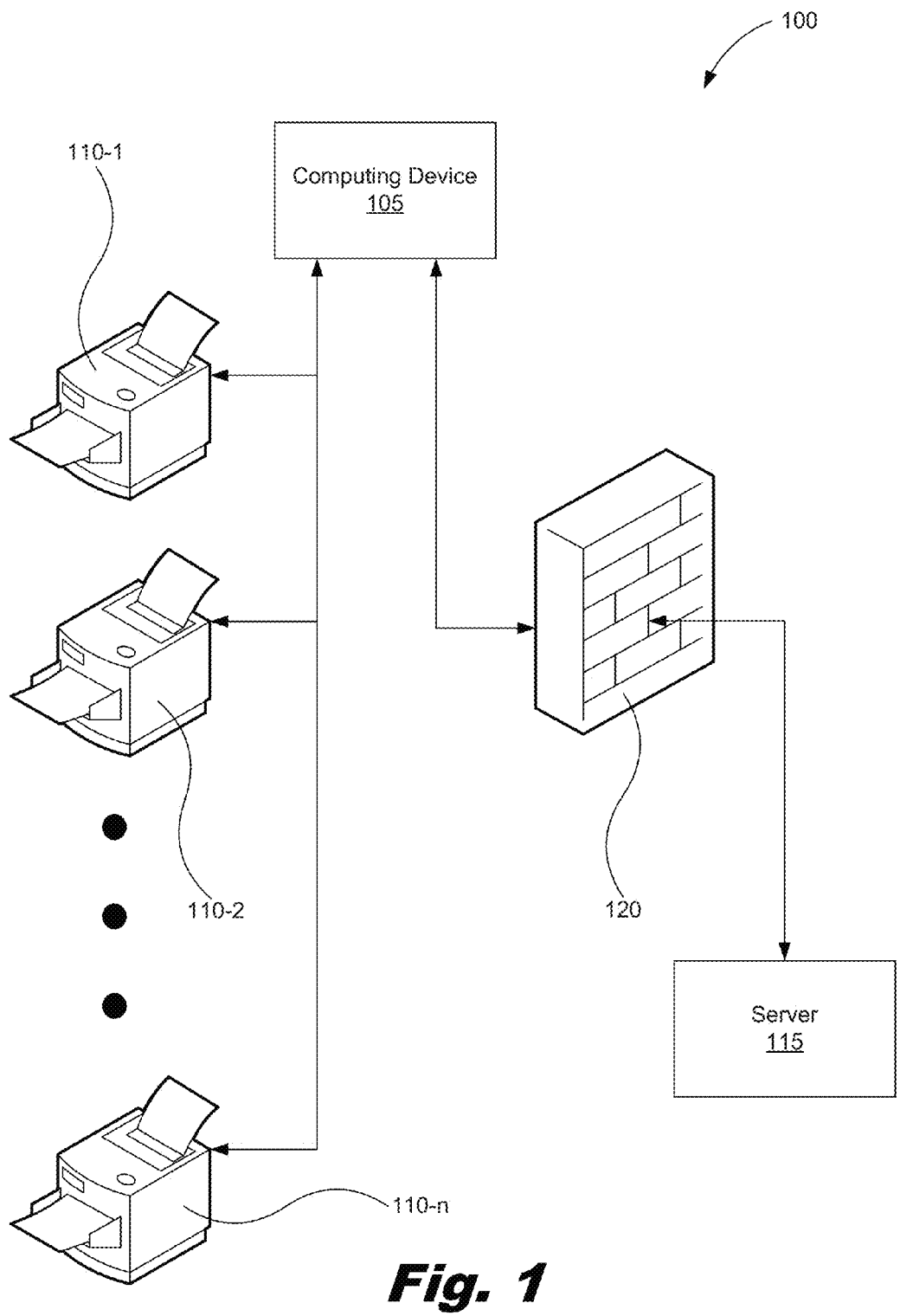
FIG. 1 is a diagram of a data collection system, according to one example of the principles described herein.

Turning now to the drawings, FIG. 1 is a diagram of a data collection system (100), according to one example of the principles described herein. The data collection system (100) comprises a two or more networked devices. In the example of FIG. 1, a computing device (105) is communicatively coupled to a server (115). A firewall (120) may be interposed between the computing device (105) and the server (115) to permit or deny network transmissions based upon a set of rules, and protect the data collection system (100) from unauthorized access while permitting legitimate communications to pass. The computing device (105) may be any device comprising at least a processor and memory, and includes, for example, a desktop computer, a laptop computer, a mobile phone, a tablet computer, or a display device, among others.

The computing device (105) is communicatively coupled to a number of printing devices (110-1, 110-2, 110-n). The printing devices (110-1, 110-2, 110-n) are communicatively coupled to the server (115) via the computing device (105). Although the present disclosure describes printing devices (110-1, 110-2, 110-n) that are associated with a data collector (FIG. 2, 340-2) comprising an executable file, and a network account comprising the computing device (105) and printing devices (110-1, 110-2, 110-n) that are the object of data collection, other devices may be coupled to the computing device (105) from which usage data is collected. For example, these other devices may include external memory devices, scanning devices, fax devices, modems, switches, and routers, among others. Thus, the devices (110-1, 110-2, 110-n) may be referred to as object devices because they are devices that are the object of the collection of usage data.

Figure 2:
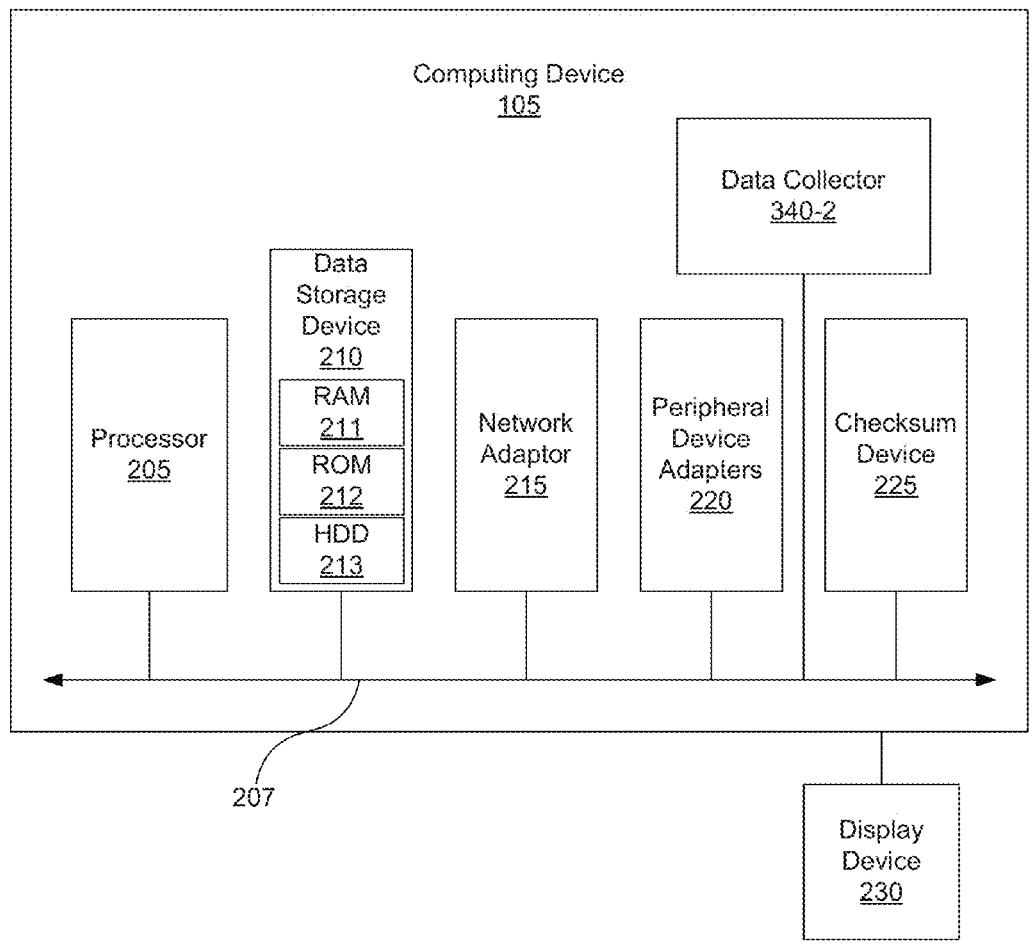
FIG. 2 is a diagram of the computing device of FIG. 1, according to one example of the principles described herein.

FIG. 2 is a diagram of the computing device (105) of FIG. 1, according to one example of the principles described herein. To achieve its desired functionality, the computing device (105) comprises various hardware components. These hardware components may include, for example, a processor (205), a data storage device (210), a network adaptor (215), peripheral device adapters (220), and a checksum device (225), among others. These hardware components may be interconnected through the use of a number of busses and/or network connections. In one example, the processor (205), data storage device (210), a network adaptor (215), peripheral device adapters (220), and checksum device (225) are communicatively coupled via bus (207).

The processor (205) may include the hardware architecture for retrieving executable code from the data storage device (210) and executing the executable code. The executable code, when executed by the processor (205), causes the processor (205) to implement at least the functionality of installing and associating a data collector (FIG. 2, 340-2) with a network account as described herein. In the course of executing code, the processor (205) may receive input from and provide output to a number of the remaining hardware units. In one example, the computing device (105) may further comprise a display device (230) for displaying user interactive text and images as will be described in more detail below.

The data storage device (210) may store data such as executable code. This executable code is processed and produced by the processor (205). The data storage device (210) may include various types of memory devices, including volatile and nonvolatile memory. For example, the data storage device (210) of the present example may include Random Access Memory (RAM) (211), Read Only Memory (ROM) (212), and Hard Disk Drive (HDD) memory (213), among others. The present specification contemplates the use of many varying type(s) of memory in the data storage device (210) as may suit a particular application of the principles described herein. In certain examples, different types of memory in the data storage device (210) may be used for different data storage needs. For example, in certain examples the processor (205) may boot from the Read Only Memory (ROM) (212), maintain nonvolatile storage in the Hard Disk Drive (HDD) memory (213), and execute program code stored in Random Access Memory (RAM) (211).

Generally, the data storage device (210) may comprise a computer readable storage medium. For example, the data storage device (210) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, among others. In the context of this document, a computer readable storage medium may be any tangible medium that can contain, or store a program for use by or in connection with an instruction execution system, apparatus, or device.

The network adaptor (215) of the computing device (105) provides the computing device (105) with connectivity to network. Thus, the computing device (105) is able to communicate with the server (115) via the network adaptor (215). The network adaptor (215) may employ a data link layer standard such as, for example, Ethernet or Wi-Fi, among others, in order to transfer data from the computing device (105) to the server (115).

The peripheral device adapters (220) of the computing device (105) enable the processor (205) to interface with various other hardware elements, external and internal to the computing device (105). For example, peripheral device adapters (220) may provide an interface to input/output devices, such as, for example, the display device (105), the printing devices (110-1, 110-2, 110-n), an external storage device, a keyboard, and a mouse, among others, to create a user interface and/or access external sources of memory storage, for example.

The computing device (105) may further include a checksum device (225) as described above. The checksum device may be implemented as a hardware device, or a combination of hardware and software that detects errors in data that may have been introduced during the transmission of the data by computing a fixed-size datum from an arbitrary block of data. The use of the checksum device (225) within the data collection system (100) will be described in more detail below.

In the present example, for the purposes of simplicity in illustration, the computing device (105), the display device (230), and the printing devices (110-1, 110-2, 110-n) are separate devices communicatively coupled to each other. However, the principles set forth in the present specification extend equally to any alternative configuration in which the computing device (105), the display device (230), and the printing devices (110-1, 110-2, 110-n) are configured as one device, or two devices with one device comprising one of these devices, and the other device comprising two of these devices. As such, alternative examples within the scope of the principles of the present specification include, but are not limited to, examples in which the computing device (105), the display device (230), and the printing devices (110-1, 110-2, 110-n) are implemented by the same computing device, examples in which the functionality of the computing device (105) is implemented by multiple interconnected computers, for example, a server in a data center and a user's client machine, and examples in which the computing device (105), the display device (230), and the printing devices (110-1, 110-2, 110-n) communicate directly through a bus without intermediary network devices.

Figure 3:
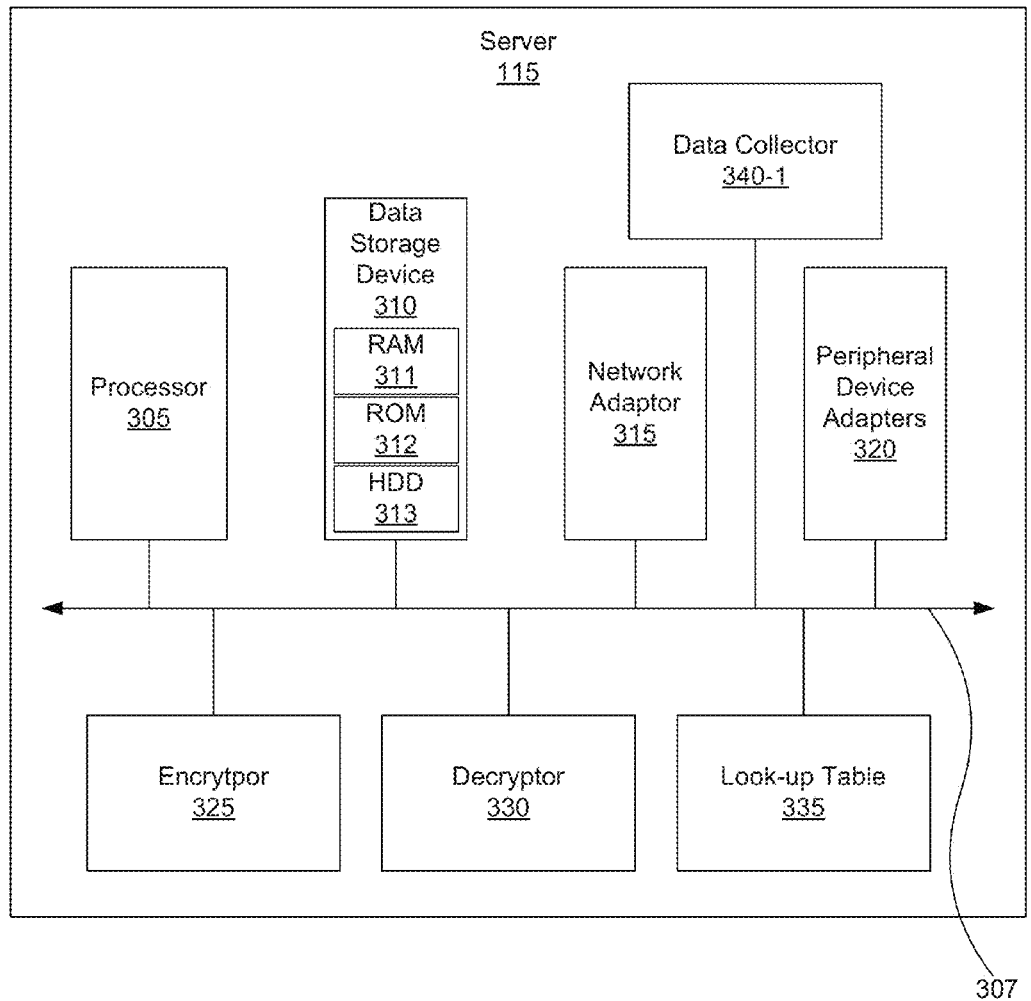
FIG. 3 is a diagram of the server of FIG. 1, according to one example of the principles described herein.

FIG. 3 is a diagram of the server (115) of FIG. 1, according to one example of the principles described herein. To achieve its desired functionality, the server (115) comprises various hardware components. These hardware components may include, for example, a processor (305), a data storage device (310), a network adaptor (315), peripheral device adapters (320), an encryptor (325), a decryptor (330), a lookup table (335), and a data collector (340-1), among others. These hardware components may be interconnected through the use of a number of busses and/or network connections. In one example, the processor (305), data storage device (310), network adaptor (315), peripheral device adapters (320), encryptor (325), decryptor (330), and lookup table (335) are communicatively coupled via bus (307).

The processor (305) may include the hardware architecture for retrieving executable code from the data storage device (310) and executing the executable code. The executable code, when executed by the processor (305), causes the processor (305) to implement at least the functionality of installing and associating a data collector (FIG. 3, 340-1) with a network account as described herein. In the course of executing code, the processor (305) may receive input from and provide output to a number of the remaining hardware units.

The data storage device (310) of the server (115) may store data such as executable code. This executable code is processed and produced by the processor (305). The data storage device (310) may include various types of memory devices, including volatile and nonvolatile memory. For example, the data storage device (310) of the present example may include Random Access Memory (RAM) (311), Read Only Memory (ROM) (312), and Hard Disk Drive (HDD) memory (313), among others. The present specification contemplates the use of many varying type(s) of memory in the data storage device (310) as may suit a particular application of the principles described herein. In certain examples, different types of memory in the data storage device (310) may be used for different data storage needs. For example, in certain examples the processor (305) may boot from the Read Only Memory (ROM) (312), maintain nonvolatile storage in the Hard Disk Drive (HDD) memory (313), and execute program code stored in Random Access Memory (RAM) (311).

Generally, the data storage device (310) may comprise a computer readable storage medium. For example, the data storage device (310) may be, but not limited to, an electronic, magnetic, optical, electromagnetic, infrared, or semiconductor system, apparatus, or device, or any suitable combination of the foregoing. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, among others. In the context of this document, a computer readable storage medium may be any tangible medium that can contain, or store a program for use by or in connection with an instruction execution system, apparatus, or device.

The network adaptor (315) of the server (115) provides the server (115) with connectivity to network. Thus, the server (115) is able to communicate with the computing device (105) via the network adaptor (315). The network adaptor (315) may employ a data link layer standard such as, for example, Ethernet or Wi-Fi, among others, in order to transfer data from the server (115) to the computing device (105).

The peripheral device adapters (320) of the server (115) enable the processor (305) to interface with various other hardware elements, external and internal to the server (115). For example, peripheral device adapters (320) may provide an interface to input/output devices, such as, for example, a display device, an external storage device, a keyboard, and a mouse, among others, to create a user interface and/or access external sources of memory storage, for example.

In one example, the server (115) may further include an encryptor (325) and a decryptor (330). The encryptor (325) is a hardware device or a combination of a hardware device and software that transforms data into an unintelligible form in such a way that the original data either cannot be obtained or can be obtained only by using a decryption process. In one example, the hardware associated with the encryptor (325) is the processor (305). The decryptor (330) is a hardware device or a combination of a hardware device and software that decodes data that has been encrypted into a secret format, and may utilize a secret key or password in decrypting the encrypted data. As will be described in more detail below, the encryptor (325) and decryptor (330) of the server (115) allow for the transmission of data between the computing device (105) and the server (115) in a secure manner to install and associate a data collector (FIG. 2, 340-2) with a network account as will be described in more detail below. Because the encryptor (325) and decryptor (330) are both located on the server (115), the information associated with the network account from In one example, the server (115) may further include a lookup table (335) instead of or in addition to the encryptor (325) and a decryptor (330). The lookup table (335) may be stored in, for example, the data storage device (310) or may be a hardware device or a combination of a hardware device and software. The lookup table (335) is a number of tables that map data in item or category attribute instances to other values. In this example, the lookup table (335) is used to map a network account ID of a user to a filename of a data collector (FIG. 2, 340-2) as stored on the user's computing device (105). In this manner, the filename associated with the network account ID stored in item or category attribute instances can be retrieved, and visa versa. Thus, the lookup table (335) may be used to create and maintain item and category information, to perform search and replace functions within an item or category, and to validate data contained in specific item or category fields. The use of the above-disclosed encryptor (325), decryptor (330), and lookup table (335) will be described in more detail below.

In one example, the server (115) may comprise an application server that provides services to users. For example, the server (115) may be a server utilized by ePrint Center located at https://h30495.www3.hp.com and operated by Hewlett-Packard Development Company, L.P.

The server (115) further comprises the data collector (340-1). The data collector (340-1) is stored on the server (115) on, for example, the data storage device (310). The data collector (340-1) is an executable file that is installed and run by a computing device such as computing device (105). Once installed on the computing device (105), the data collector (FIG. 2, 340-2) collects data regarding the usage of a device communicatively coupled to the computing device (105) such as, for example, the printers (110-1, 110-2, 110-n). Once this usage data is collected, the data collector (FIG. 2, 340-2) sends the usage data to the server (115). As will be described in more detail below, a version of the data collector (340-1) is transferred from the server (115) to the user's computing device (105). The data collector (FIG. 2, 340-2) is stored on the computing device (105) with a filename that comprises information related to a network account registered with the server (115).

Figure 4:
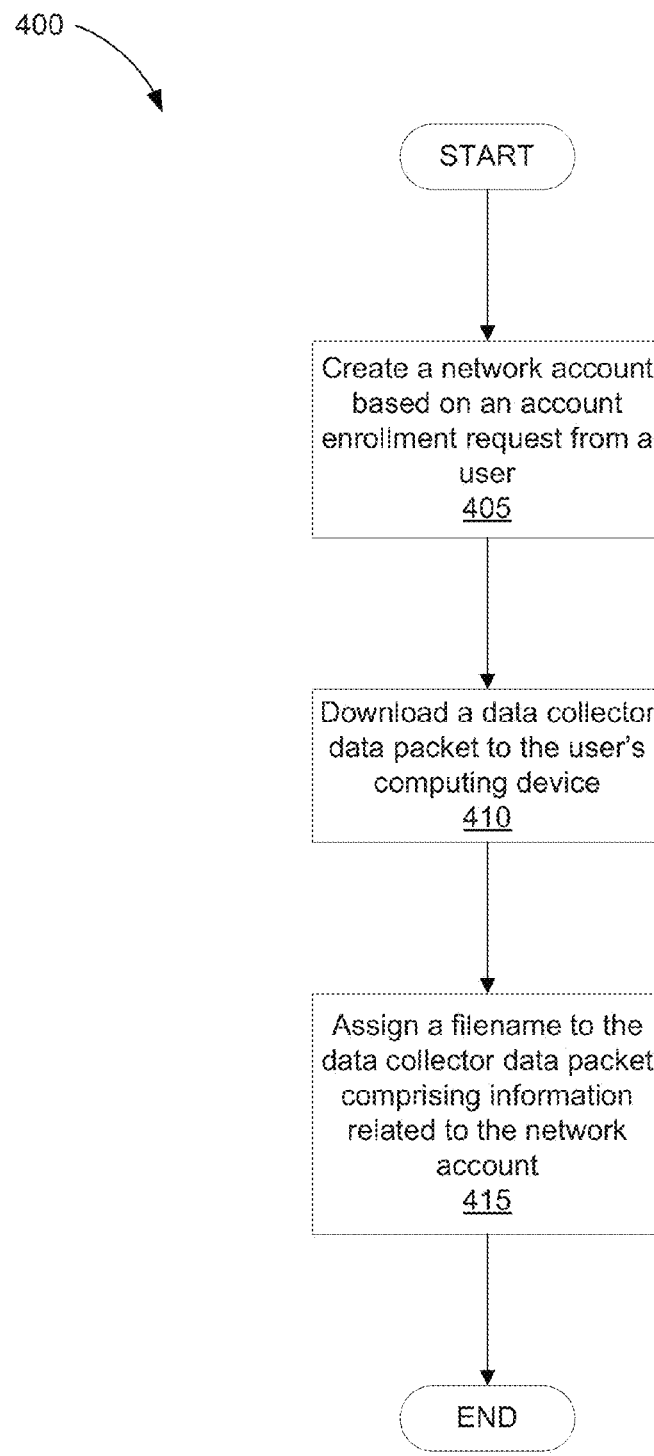
FIG. 4 is a flowchart showing a method for implementing a data collector using the data collection system, according to one example of the principles described herein.

FIG. 4 is a flowchart showing a method for implementing a data collector using the data collection system (100), according to one example of the principles described herein. The method (400) may begin by creating (block 405) a network account based on an account enrollment request from a user. Information about the network account may be stored in, for example, the data storage device (310) of the server (115). A data collector data packet (FIG. 3, 340-1) that is stored, for example, on the data storage device (310) of the server (115), is downloaded (block 410) to the user's computing device (105). The downloaded data collector (FIG. 2, 340-2) is assigned (block 415) a filename that comprises information related to the network account. After being assigned a filename, the data collector (FIG. 2, 340-2) may be stored in, for example, the data storage device (210) of the user's computing device (105).

Figure 12:
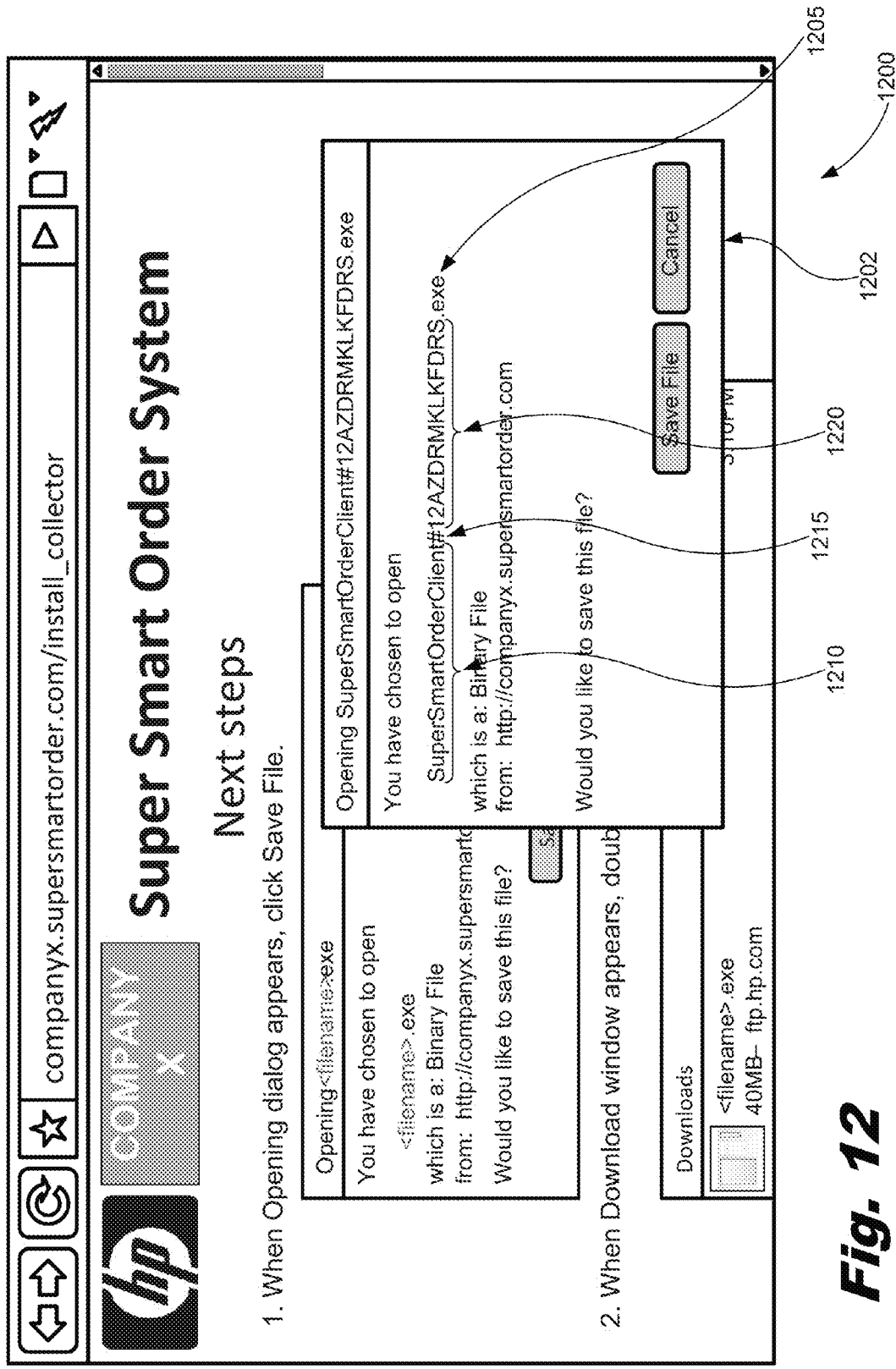
FIG. 12 is a screen shot of a save file popup window presented after initiation of the download of the data collector at FIG. 9, according to an example of the principles described herein.

As described above, the data collector (FIG. 2, 340-2) is assigned (block 415) a filename (FIG. 12, 1205) that comprises information related to the network account created at block 405. FIG. 12 is a screen shot (1200) of a save file popup window (1202) presented after initiation of the download of the data collector (FIG. 3, 314-1) at FIG. 9, according to an example of the principles described herein. In one example, the filename (FIG. 12, 1205) may comprise a generic portion (FIG. 12, 1210) and a user network account specific portion (FIG. 12, 1220). The file name may be, for example, "SuperSmartOrderClient#12AZDRMKLKFDRS.exe," where "SuperSmartOrderClient" is the generic portion (FIG. 12, 1210) of the filename common among the filename assigned to all instances of the data collector (FIG. 2, 340-2) downloaded to users computing devices (105) as depicted in FIG. 12.

The portion following the mark "#" (FIG. 12, 1215) is the user network account specific portion (FIG. 12, 1220). The user network account specific portion (FIG. 12, 1220) may comprise a number of characters. In the example above, these characters are "12AZDRMKLKFDRS." In one example, the number of characters that make up the user network account specific portion (FIG. 12, 1220) of the filename (FIG. 12, 1205) may be randomly assigned by the server (115) and associated with the user's network account. In this example, the lookup table (335) stored in the server (115) associates the randomly assigned character set with the user's network account created at block 405.

When an association between the printing devices (110-1, 110-2, 110-n) and the server (115) is made in order to, for example, transmit usage data of the printing devices (110-1, 110-2, 110-n) to the server (115), the network account specific portion (FIG. 12, 1220) of the filename (FIG. 12, 1205) is extracted from the filename (FIG. 12, 1205) and matched against the list of network account IDs in the lookup table (FIG. 3, 335). In one example, the lookup table may appear like the following table.

TABLE 1

Lookup Table of Network Account IDs and Corresponding Network Account Specific Portions of Filenames

| Network Account ID | Network Account Specific Portion of Filename |
|---|---|
| cosmo.kramer@gmail.com | 32FKGORNVLSVSF |
| joetheplumber@hp.com | 12AZDRMKLKFDRS |
| johndoe@vancott.com | 90BMSNIRWEBSDG |
| janedoe@hotmail.com | 48FJFNAOPOTNVM |

As can be seen in Table 1, the network account specific portion (FIG. 12, 1220) "12AZDRMKLKFDRS" of the filename (FIG. 12, 1205) is associated with network account ID "joetheplumber@hp.com." The network account ID may be any identification associated with the network account including, for example, an email address input by the user at FIG. 7 as will be discussed in more detail below. In another example, the network account ID may be, for example, a network account ID assigned by the server (115), a user-defined network account ID, a media access control (MAC) address of the one of the user's devices such as the computing device (105) or a printer (110-1, 110-2, 110-n), and combinations thereof, among others. In the example described in Table 1, the network account ID is an email address. The user may provide this email address when the user indicates a desire to create a network account. In another example, the user may provide this email address when the user indicates a desire to download the data collector (FIG. 3, 340-1).

In another example, the number of characters that make up the network account specific portion (FIG. 12, 1220) of the filename (FIG. 12, 1205) may be obtained from the server (115) as an encrypted data set whose decrypted form is randomly or non-randomly assigned by the server (115) and associated with the user's network account created at block 405. In this example, the server (115) generates a series of characters and assigns that series of characters as the network account specific portion (FIG. 12, 1220) of the filename (FIG. 12, 1205). The server (115) also stores an encryption key that specifies the particular transformation used by the encryptor (375) during encryption of the network account specific portion (FIG. 12, 1220) of the filename (FIG. 12, 1205). The encryption key also specifies the particular transformation of the encrypted series into a decrypted series by the decryptor (380) during decryption of the network account specific portion (FIG. 12, 1220), The network account specific portion (FIG. 12, 1220) of the filename (FIG. 12, 1205) may also comprise a number of checksum values. As described above, the checksum device (225) detects errors in data that may have been introduced during the transmission of data such as, for example, the filename (FIG. 12, 1205) by computing a fixed-size datum from the filename (FIG. 12, 1205). In one example, a number of values included in the network account specific portion (FIG. 12, 1220) of the filename (FIG. 12, 1205) may be used as the checksum to verify that the filename (FIG. 12, 1205) is valid and has not been tampered with. In one example, if the checksum device (225) detects that the filename (FIG. 12, 1205) is not valid or has been tampered with, a notification may be presented to the user indicating that the filename is invalid or has been tampered with and that the data collector data packet (FIG. 2, 340-2) may not be executed. In another example, information indicating that a new version of the data collector data packet (FIG. 2, 340-2) may be downloaded may be transmitted to the user in addition to the above notification regarding unexecutability of the data collector data packet (FIG. 2, 340-2). In this example, the user may be instructed to not alter the filename (FIG. 12, 1205) as assigned by the system (100).

Once assigned, and encrypted, the encrypted version of the network account specific portion (FIG. 12, 1220) is included, in its encrypted form, in the filename. In this example, when an association between the printing devices (110-1, 110-2, 110-n) and the server (115) is made in order to, for example, transmit usage data of the printing devices (110-1, 110-2, 110-n) to the server (115), the network account specific portion (FIG. 12, 1220) of the filename (FIG. 12, 1205) is extracted, decrypted, and matched against the list of network account IDs in the lookup table (FIG. 3, 335 and Table 1). Once the network account is identified through the matching of the network account specific portion (FIG. 12, 1220) of the filename (FIG. 12, 1205) to the network account ID, data regarding the use of a number of printers associated with the network account may be collected as will be described in more detail below.

In one example, the data collector data packet (FIG. 2, 340-2) may be downloaded via a hypertext transfer protocol (HTTP) response. In this example, the HTTP response comprises a header comprising the filename (FIG. 12, 1205) and a body comprising the data collector data packet (FIG. 2, 340-2) as an executable file. The header is modified to include the filename (FIG. 12, 1205) as generated above at block 415 of FIG. 4.

In one example, other data regarding usage of other devices other than printing devices (110-1, 110-2, 110-n) may be gathered using the processes described herein. For example, data regarding the use of devices such as external memory devices, scanning devices, fax devices, modems, and routers, among other devices may be gathered. Data regarding the use of printers and other devices allows a manufacturer, service provider, or third party to understand a user's ongoing needs in connection with that device.

Figure 5:
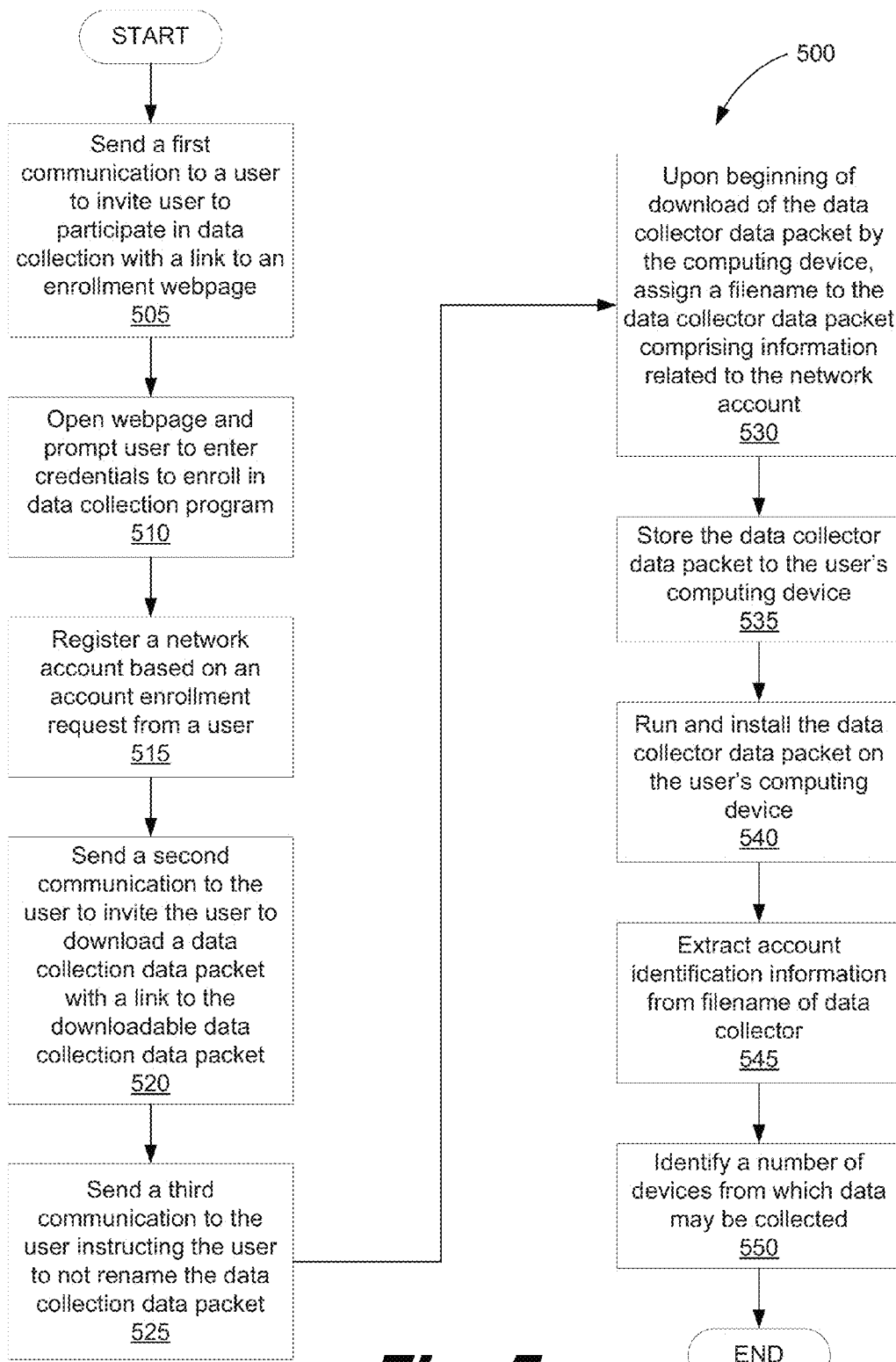
FIG. 5 is a flowchart showing a method for implementing a data collector using the data collection system, according to another example of the principles described herein.
Figure 6:
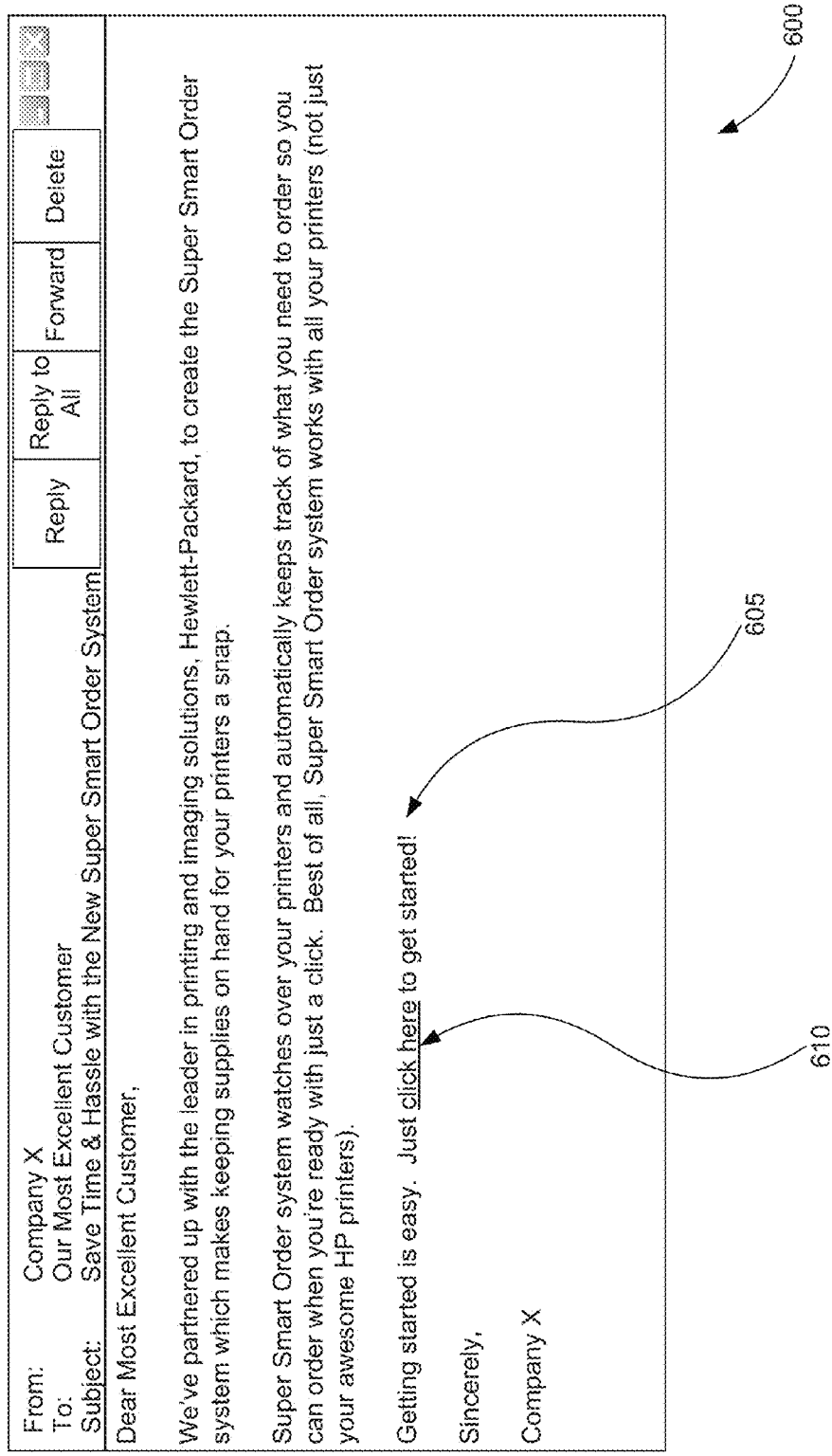
FIG. 6 is an email inviting a potential user to participate in data collection, according to an example of the principles described herein.

FIG. 5 is a flowchart showing a method (500) for implementing a data collector using the data collection system, according to another example of the principles described herein. FIG. 5 will be described in connection with FIGS. 6 through 18. The method (500) may begin by sending (block 505) a first communication (FIG. 6, 600). FIG. 6 is an email (FIG. 6, 600) inviting a potential user to participate in data collection, according to an example of the principles described herein. The first communication (FIG. 6, 600) comprises an invitation (FIG. 6, 605) to participate in collection of data relating to the usage of the number of printing devices (110-1, 110-2, 110-n) as the data collector (FIG. 2, 340-2), when executed by the processor (205) of the computing device (105), would bring about. Communications transmitted to a user throughout this disclosure may be in the form of an email as described above in connection with FIG. 6. In another example, the communications may be in the form of banner ads, web pages, telephonic communications, and non-electronic forms of communication including mail and paper ads.

The invitation (FIG. 6, 605) may include, for example, a hyperlink (FIG. 6, 610). Once the user clicks on the hyperlink (FIG. 6, 610), the system (100) opens (block 510) a web page and prompts the user to enter credentials to enroll in data collection program. FIG. 7 is a screen shot of an introductory web page (700) presented to a user in response to the user's selection of a hyperlink within the email (FIG. 6, 600) of FIG. 6, according to an example of the principles described herein. The introductory web page (FIG. 7, 700) may be presented to the user on the display device (230) of the computing device (105), and comprises a prompt (705) to enter a number of credentials in order to create a network account. In one example, a single credential is used to create the network account. In this example, an email address may be the credential used. As depicted in FIG. 7, a user may select a confirmation button (710) after the user enters the credentials.

Figure 8:
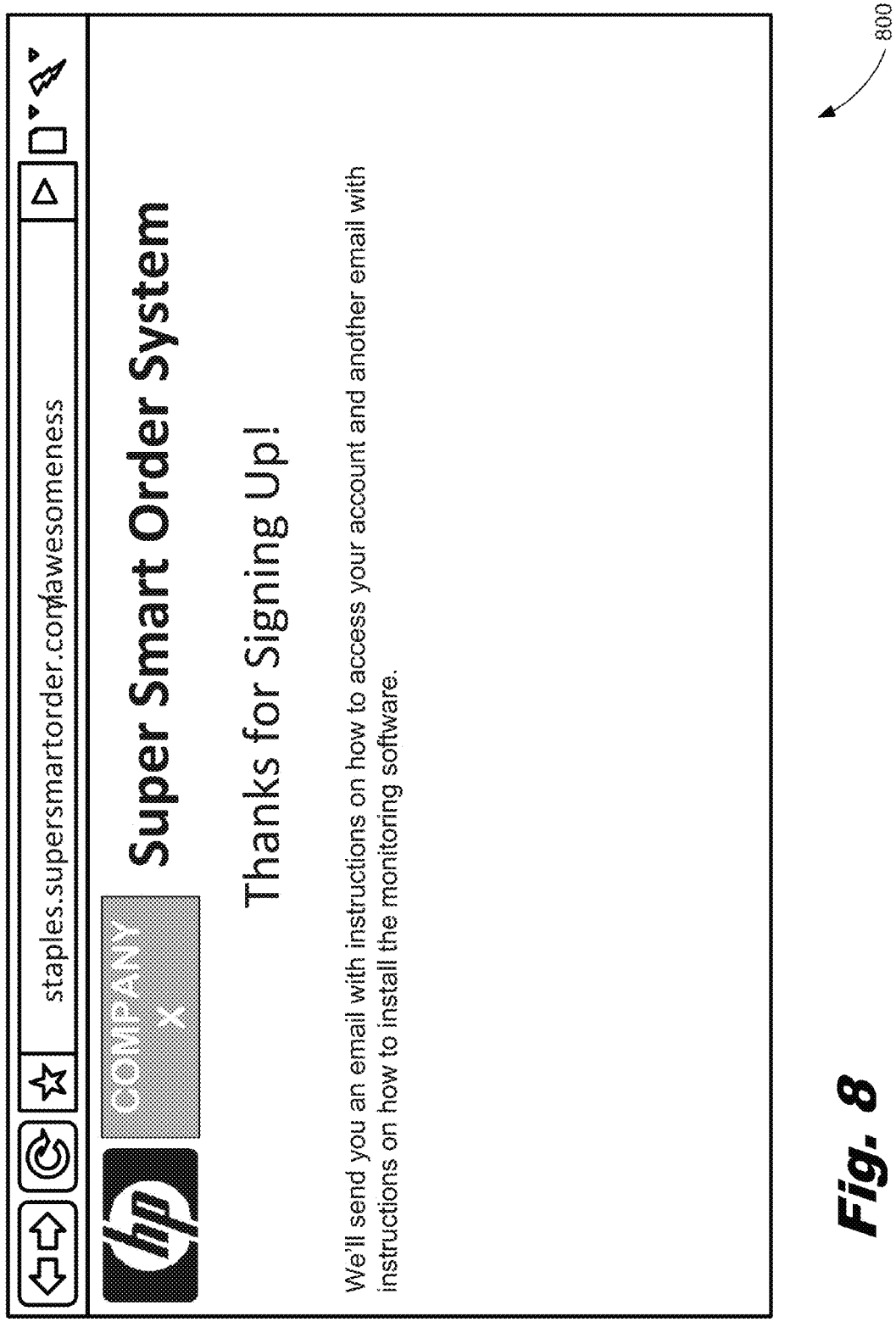
FIG. 8 is a screen shot of a confirmation web page presented to a user in response to the user's entry of an email address in the introductory web page of FIG. 7, according to an example of the principles described herein.

A network account is then registered (block 515) based on the account enrollment request made by the user at block (block 510). FIG. 8 is a screen shot of a confirmation web page (800) presented to a user in response to the user's entry of an email address in the introductory web page (700) of FIG. 7, according to an example of the principles described herein. The confirmation web page (800) provides the user with confirmation that a network account has been registered and associated with the user. This confirmation web page (800) may also comprise information regarding network account access and instructions to download and install the data collector (FIG. 3, 340-1).

Figure 9:
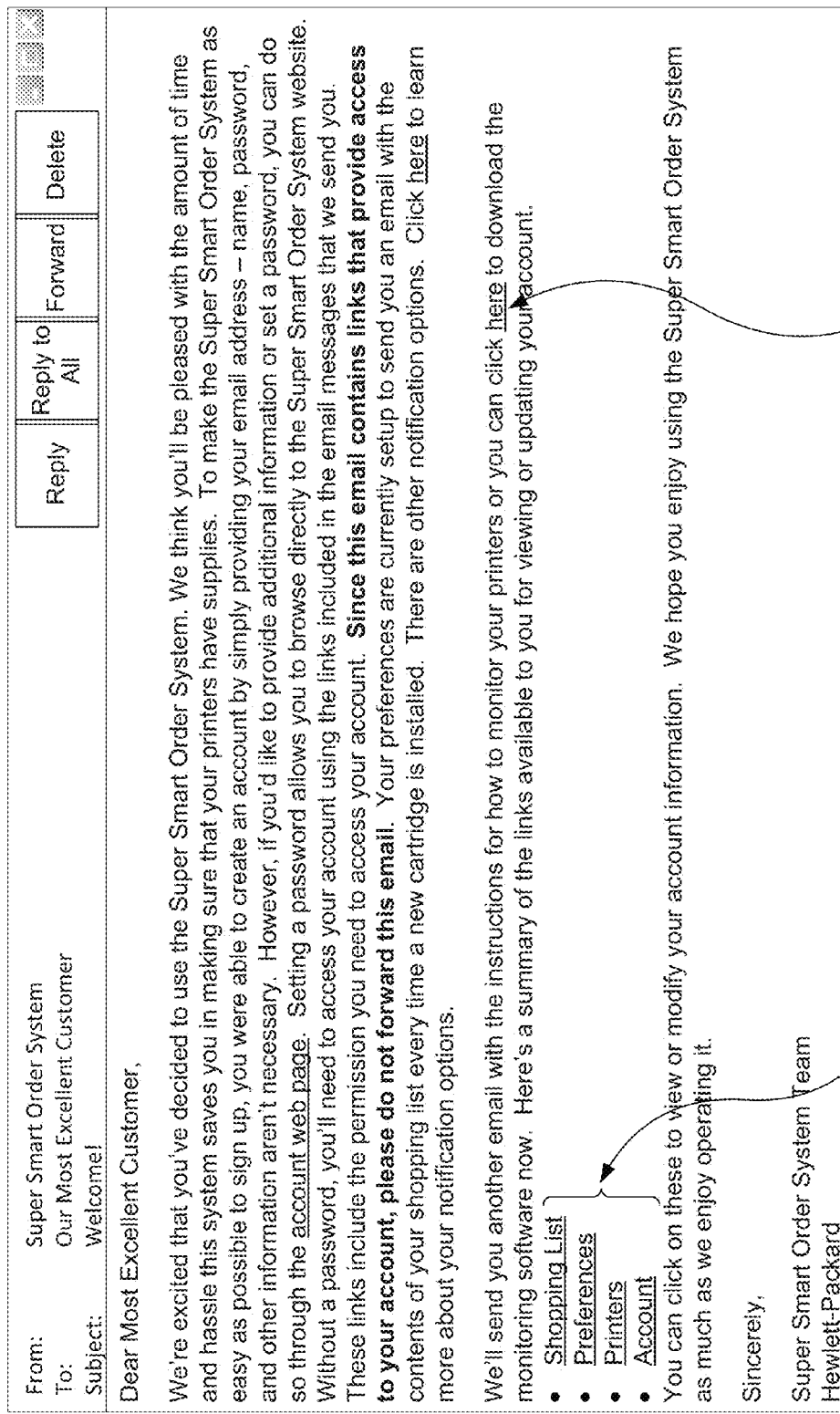
FIG. 9 is an email directing a user to download a data collector, according to an example of the principles described herein.

A second communication (FIG. 9, 900) is sent (block 520) to the user to invite the user to download the data collector (FIG. 3, 340-1). FIG. 9 is an email (900) directing the user to download the data collector (FIG. 3, 340-1), according to an example of the principles described herein. As depicted in FIG. 9, the email (900) may comprise account links (905) by which a user may add information to or modify their network account, set preferences, access and modify a shopping list, and access a printer list, among others. The email (900) may further comprise a hyperlink (910) that allows the user to download the data collector (FIG. 3, 340-1).

Figure 10:
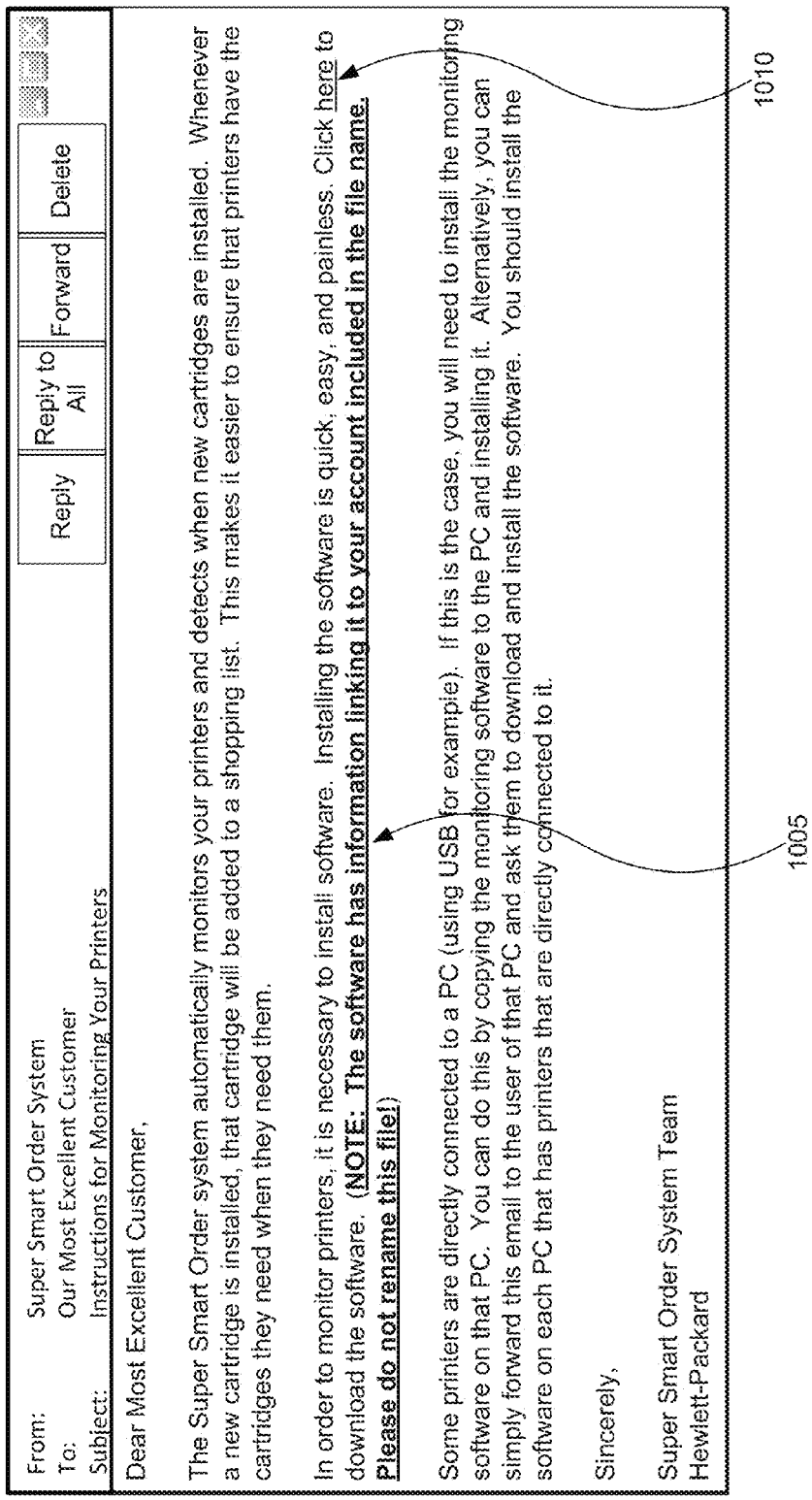
FIG. 10 is an email directing a user to not rename the data collection data pack as downloaded, according to an example of the principles described herein.

A third communication (FIG. 10, 1000) may be sent (FIG. 5, block 525) to the user instructing the user to not rename the data collector (FIG. 2, 340-2) during or after download of the data collector (FIG. 2, 340-2). FIG. 10 is an email (1000) directing a user to not rename the data collection data pack as downloaded, according to an example of the principles described herein. As depicted in FIG. 10, the user may be sent a third communication (1000) in the form of, for example, an email that comprises a hyperlink (1010) that allows the user to download the data collector (FIG. 3, 340-1). The third communication also comprises an advisory note (1005) that instructs the user to not rename the file comprising the data collector (FIG. 2, 340-2) during or after saving the data collector (FIG. 2, 340-2) on the data storage device (210) of the user's computing device (105). As described above in connection with FIGS. 4 and 12, the filename (FIG. 12, 1205) of the data collector (FIG. 2, 340-2) comprises a generic portion (FIG. 12, 1210) and a user network account specific portion (FIG. 12, 1220).

Because the user network account specific portion (FIG. 12, 1220) of the filename (FIG. 12, 1205) is specific to the user's network account and associated with the user's computing device (105) and printing devices (110-1, 110-2, 110-n), the filename (FIG. 12, 1205) of the data collector (FIG. 2, 340-2) should not be changed. If the filename (FIG. 12, 1205) of the data collector (FIG. 2, 340-2) is changed, the server (115) would recognize the data collector (FIG. 2, 340-2) stored on the computing device (105) as being associated with another device. Thus, the device usage data collected by the system (100) would not be associated with the user's computing device (105) and printing devices (110-1, 110-2, 110-n). Therefore, for this reason, the user is instructed to not rename the filename (FIG. 12, 1205) of the data collector (FIG. 2, 340-2).

In one example, the second communication (FIG. 9, 900) and third communication (FIG. 10, 1000) may be incorporated into a single communication to the user. In this example, all the information contained within the second communication (FIG. 9, 900) and third communication (FIG. 10, 1000)

are included within the single communication. In this manner, the user receives less communications.

Figure 11:
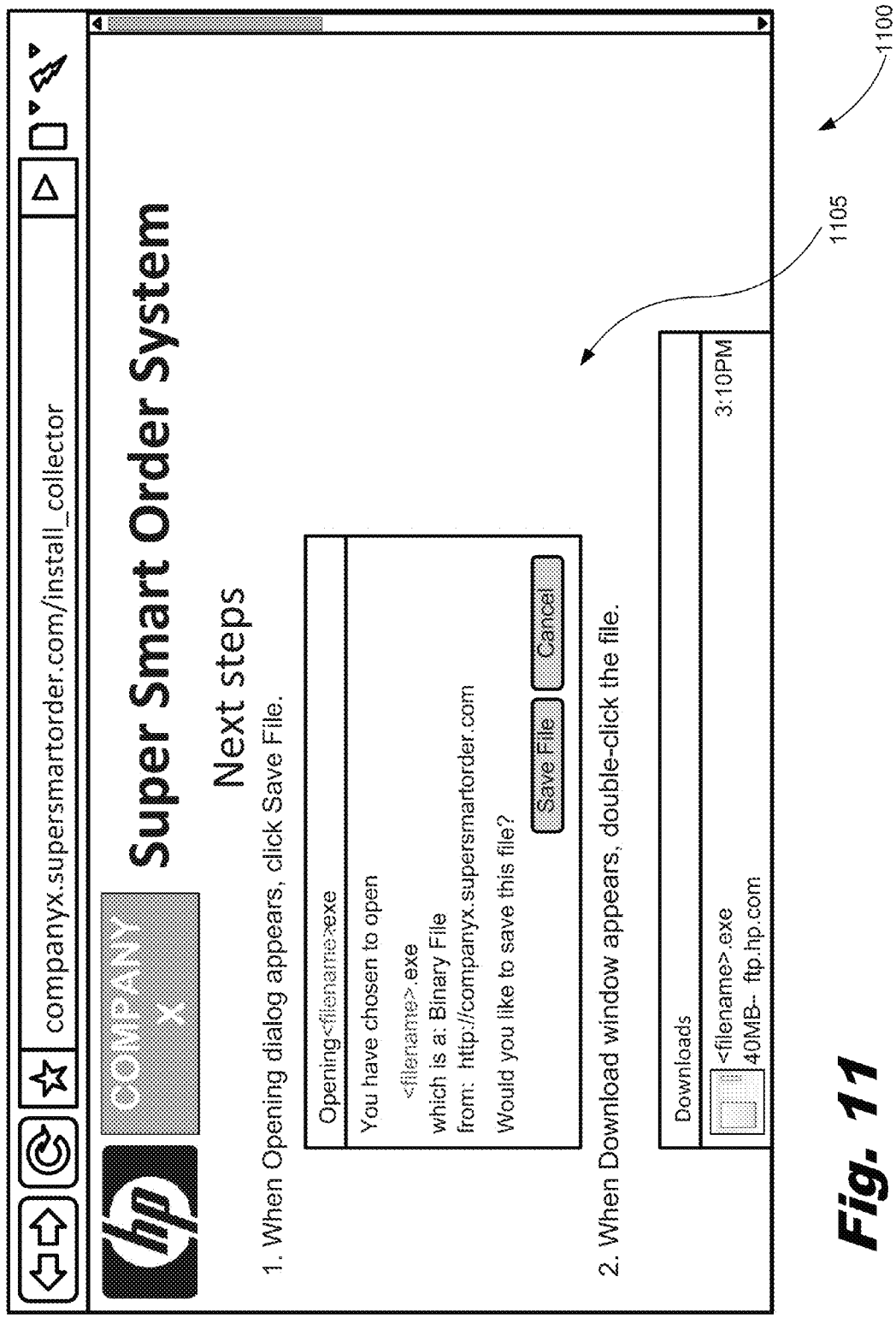
FIG. 11 is a screen shot of download instructions presented to the user after initiation of the download of the data collector at FIG. 9, according to an example of the principles described herein.

FIG. 11 is a screen shot (1100) of download instructions presented to the user after initiation of the download of the data collector (FIG. 3, 340-1) at FIG. 9, according to an example of the principles described herein. The display device (230) of the user's computing device (105) may display instructions (1105) to the user on how to download the data collector (FIG. 3, 340-1) and what may be expected during the download process. The download instructions (1105) may include, for example, instructions on which actions to take during the download process, instructions regarding firewall issues, security warnings, and access control settings, among others.

As described above, a filename (FIG. 12, 1205) is assigned (FIG. 5, block 530) to the data collector (FIG. 2, 340-2) upon beginning of the download of the data collector (FIG. 3, 340-1) to the user's computing device (105). FIG. 12 is a screen shot (1200) of a save file popup window (1202) presented after initiation of the download of the data collector (FIG. 3, 314-1) at FIG. 9, according to an example of the principles described herein. The filename (FIG. 12, 1205) comprises information relating to the user's network account as described above in connection with FIGS. 4 and 12. The data collector (FIG. 2, 340-2) is stored (block 535) on the user's computing device (105). In one example, the data collector (FIG. 2, 340-2) is stored (block 535) on the data storage device (210) of the user's computing device (105).

Figure 13:
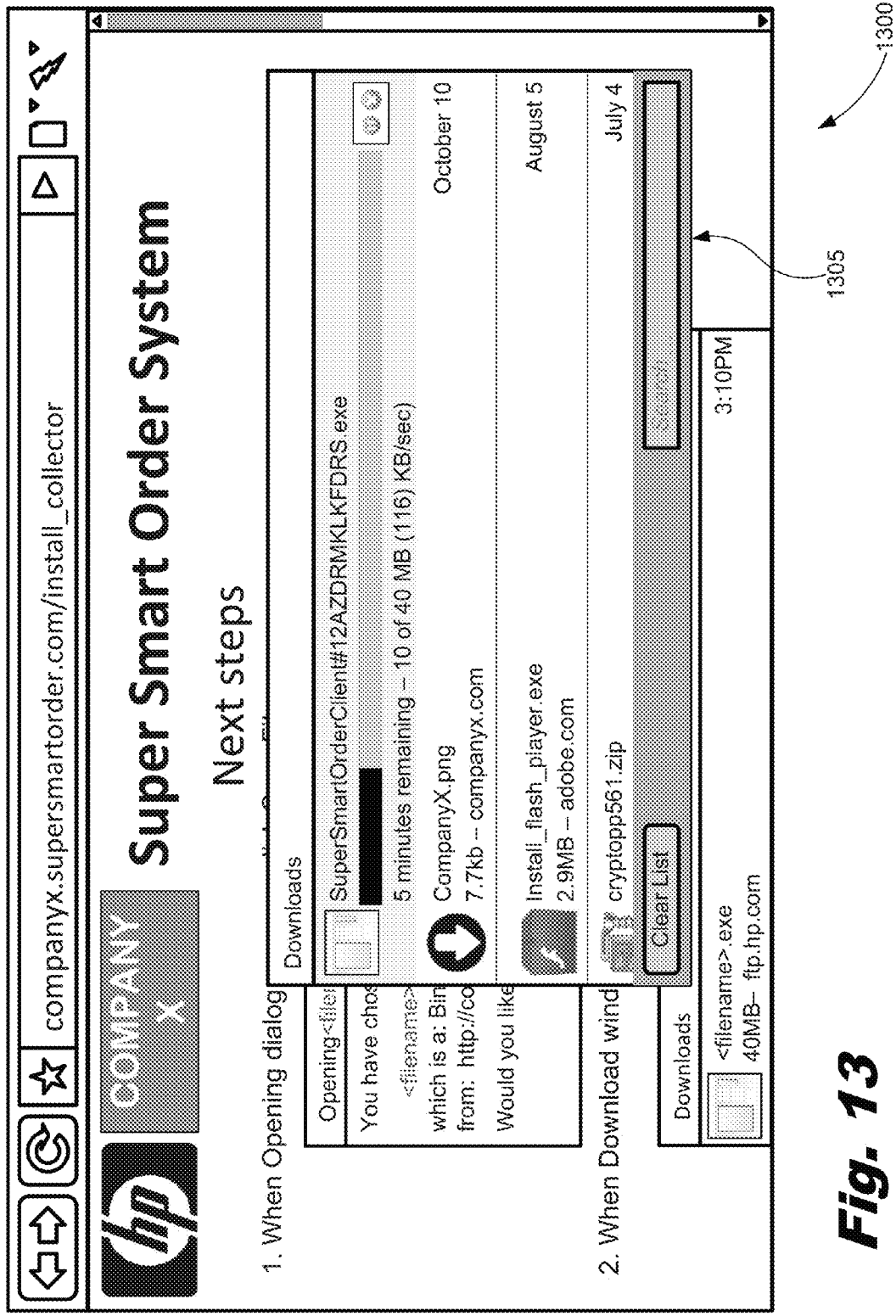
FIG. 13 is a screen shot of a download progress popup window presented after saving of the data collector file at FIG. 12, according to an example of the principles described herein.

FIG. 13 is a screen shot (1300) of a download progress popup window (1305) presented after saving of the data collector (FIG. 2, 340-2) the at FIG. 12, according to an example of the principles described herein. The download progress popup window (1305) assists the user in understanding the progress of the transfer of the data collector (FIG. 2, 340-2) from the server (115) to the computing device (105).

Figure 14:
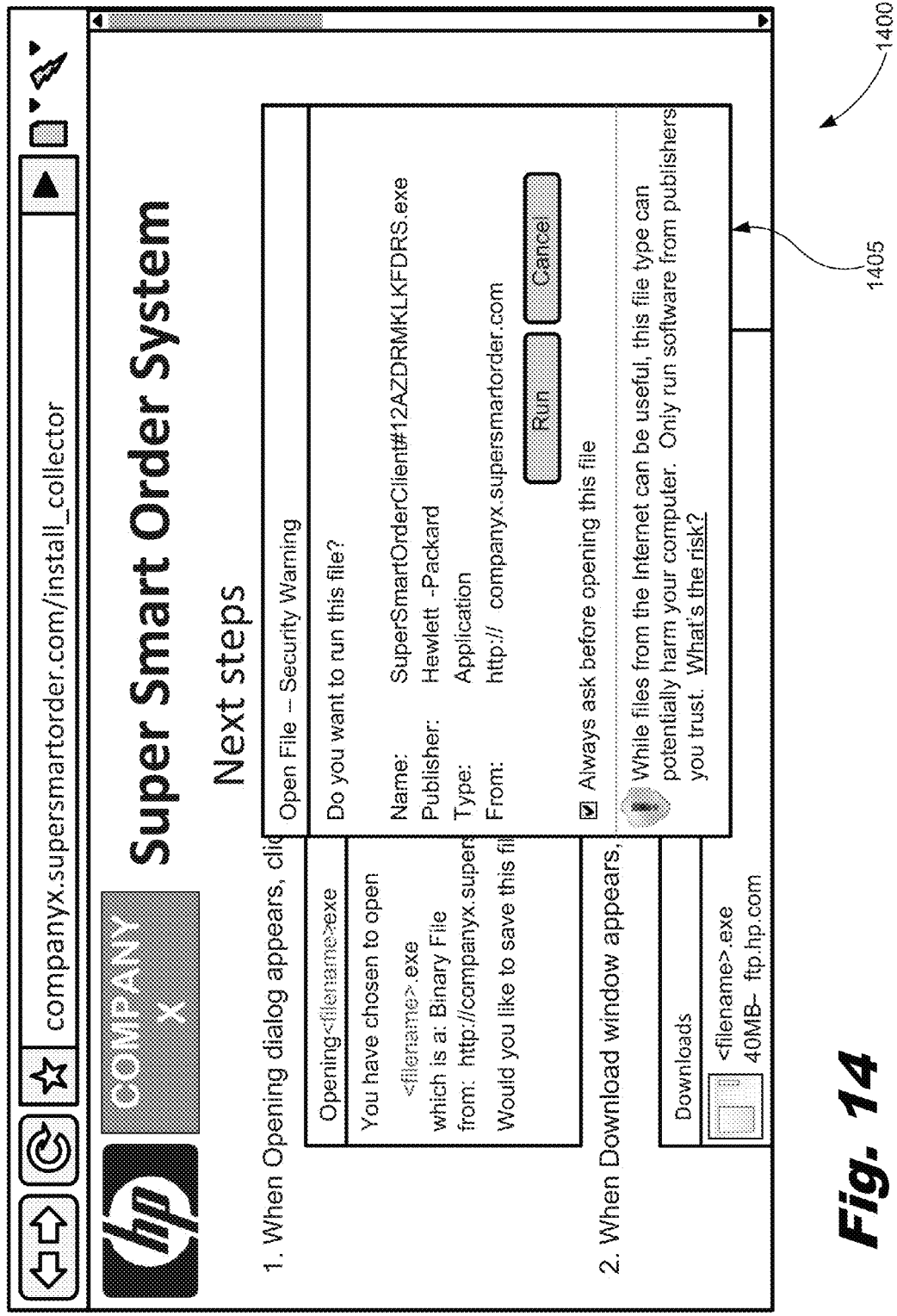
FIG. 14 is a screen shot of a run request popup window presented after completion of the download of the data collector file, according to an example of the principles described herein.

Returning to FIG. 5 again, once downloaded, the data collector (FIG. 2, 340-2) may be run and installed (block 540) on the user's computing device (105). FIG. 14 is a screen shot (1400) of a run request popup window (1405) presented after completion of the download of the data collector (FIG. 2, 340-2), according to an example of the principles described herein. The user is prompted, via the run request popup window (1405), to run and install the data collector (FIG. 2, 340-2) on the user's computing device (105). During the running and installation of the data collector (FIG. 2, 340-2), a number of installation windows may appear requesting additional information such as, for example, location information, and acceptance of a license agreement, among other information.

Once the data collector (FIG. 2, 340-2) is run on the computer device (105), the server (115) extracts (block 545) the network account specific portion (FIG. 12, 1220) of the filename (FIG. 12, 1205), and matches the network account specific portion (FIG. 12, 1220) against the list of network account IDs in the lookup table (FIG. 3, 335) as described above in connection with FIG. 3. In one example, block 545 is implemented to transmit usage data of the printing devices (110-1, 110-2, 110-n) to the server (115).

Figure 15:
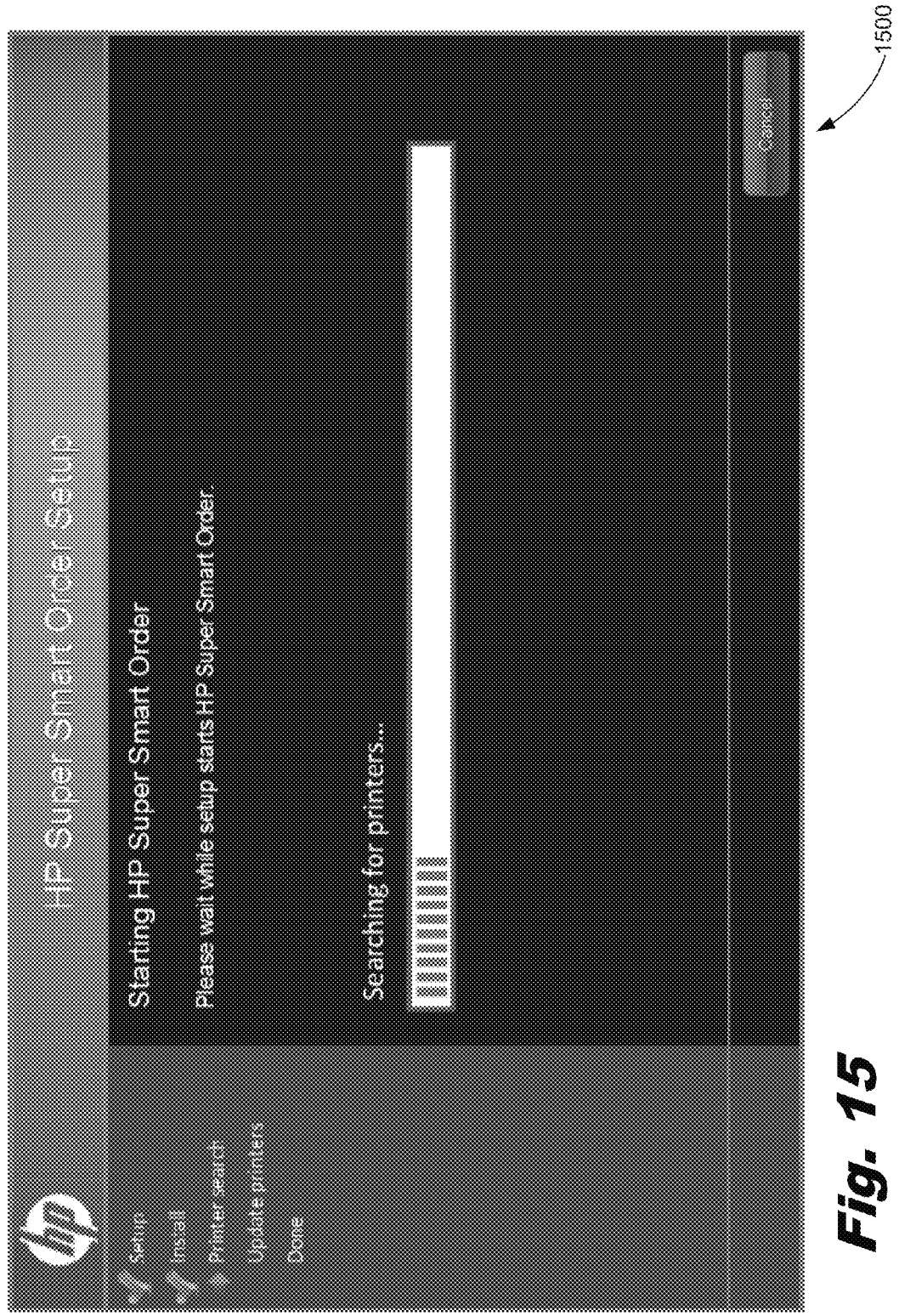
FIG. 15 is a screen shot of the data collector, when executed, discovering a number of printers, according to an example of the principles described herein.

In another example, the network account specific portion (FIG. 12, 1220) of the filename. (FIG. 12, 1205) is extracted (block 545) to identify (block 550) a number of devices from which data may be collected. As described above, the devices may include, for example, printers (110-1, 110-2, 110-n). FIGS. 15 through 18 depict the process by which the data collector (FIG. 2, 340-2) identifies (block 550) the printers. FIG. 15 is a screen shot (1500) of the data collector (FIG. 2, 340-2), when executed, discovering a number of printers (110-1, 110-2, 110-n), according to an example of the principles described herein. The data collector (FIG. 2, 340-2) may use any type of network scan to discover hardware devices, such as computers and the printing devices (110-1, 110-2, 110-n), that exist in the user's network. In one example, the network scan results may include details of the discovered devices, including IP addresses and device names.

Figure 16:
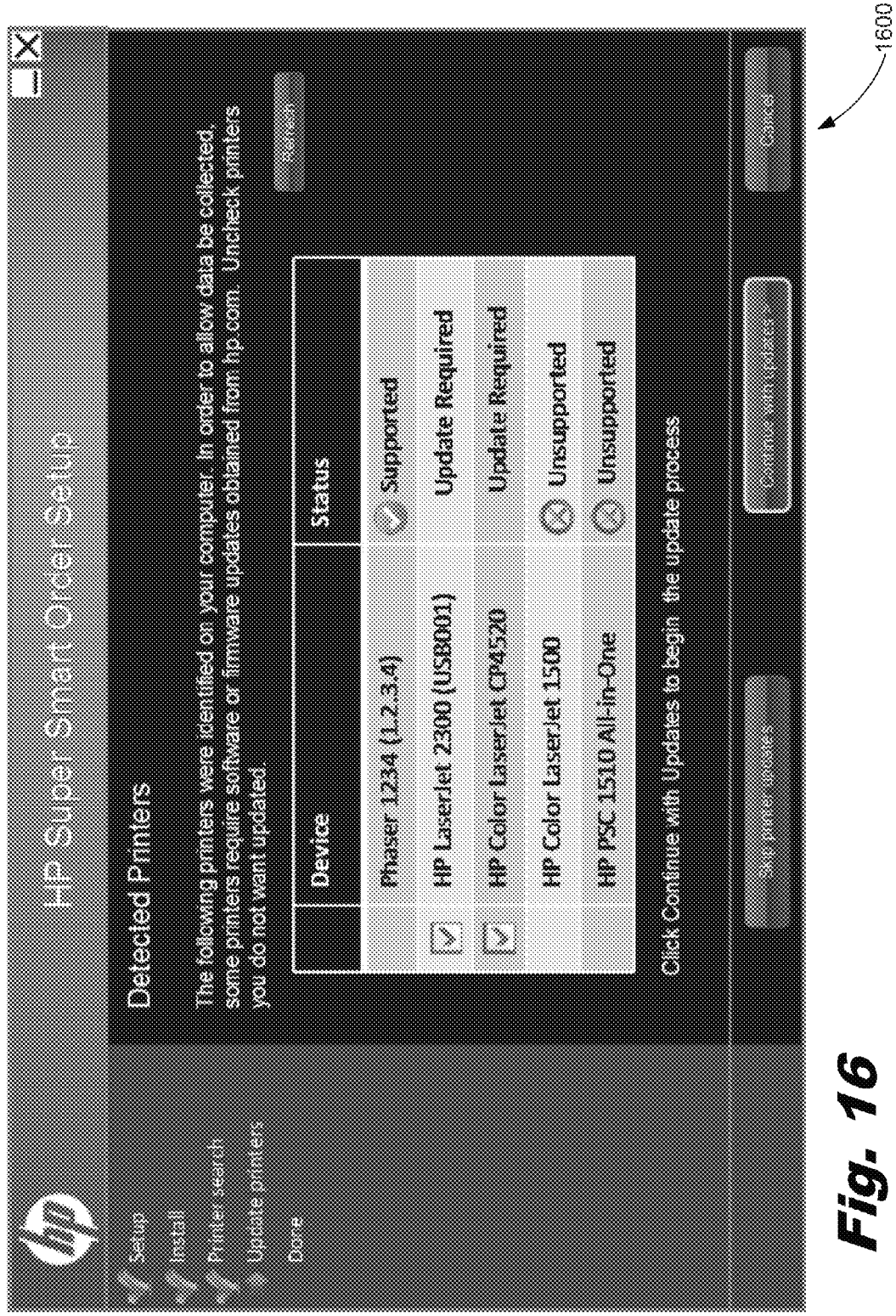
FIG. 16 is a screen shot of a list of detected printing devices that support data collection resulting from the discovery process of FIG. 15, according to an example of the principles described herein.
Figure 17:
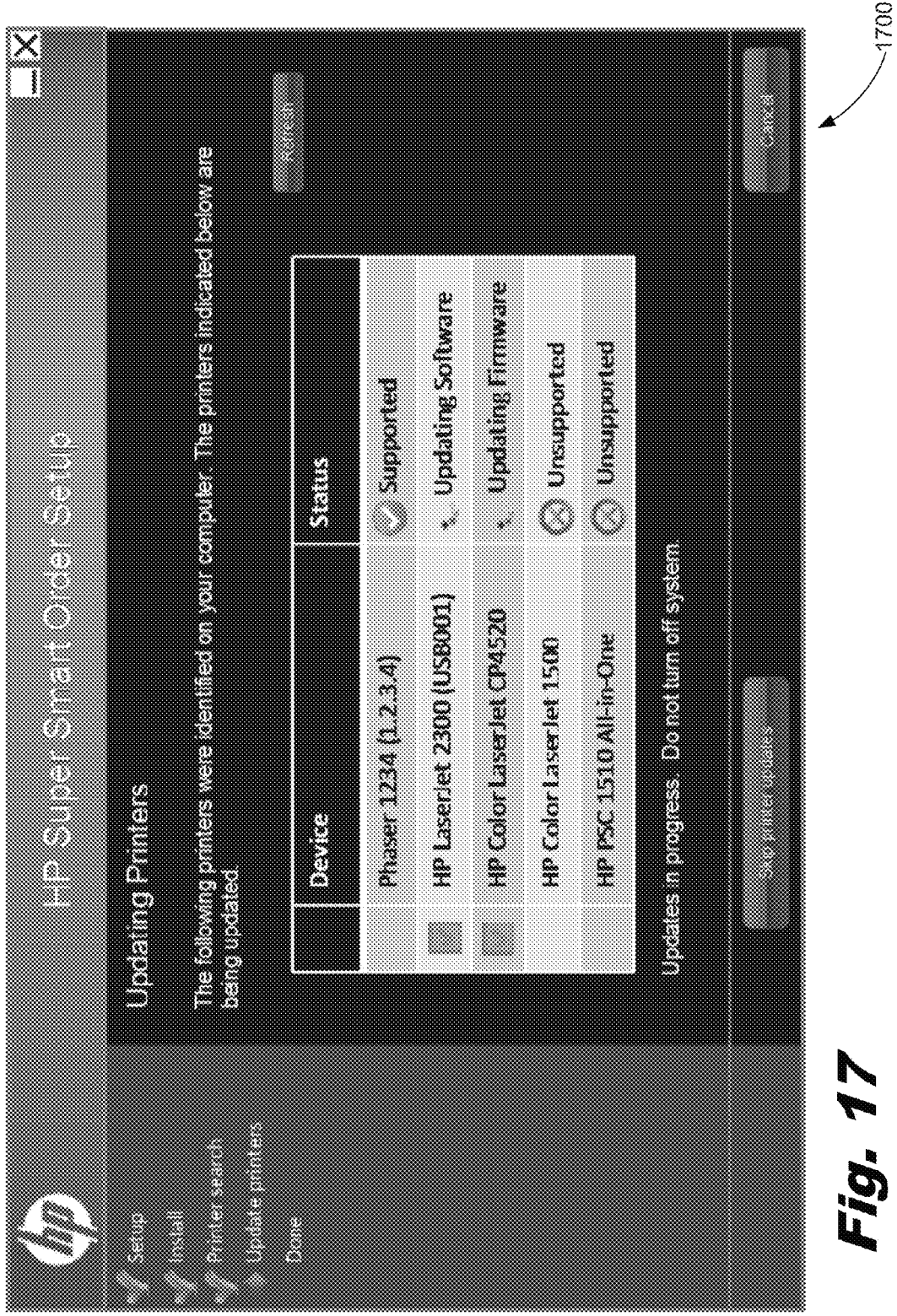
FIG. 17 is a screen shot of the data collector, when executed, updating a number of printing devices, according to an example of the principles described herein.
Figure 18:
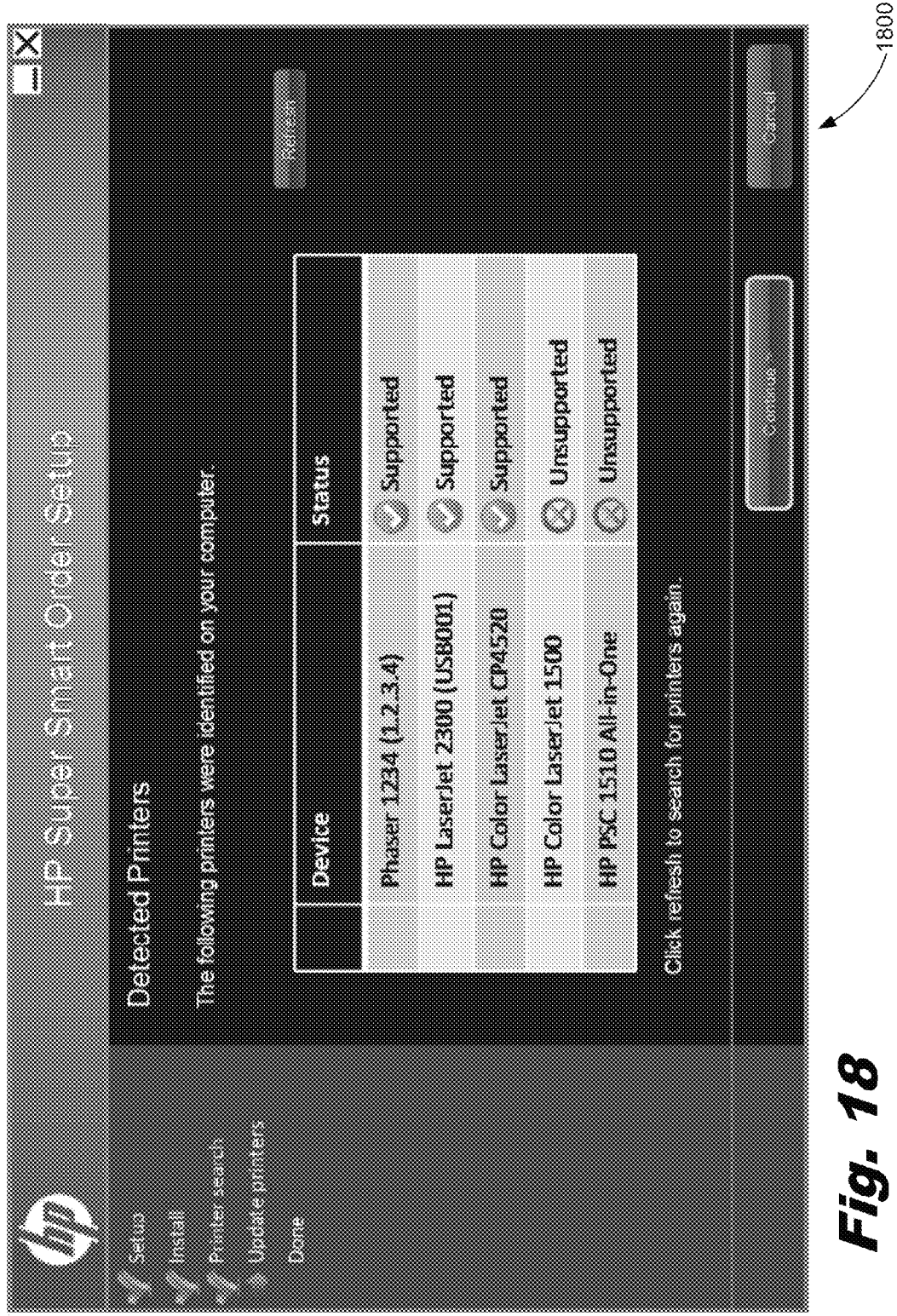
FIG. 18 is a screen shot of a list of detected printing devices that support data collection resulting from the update process of FIG. 17.

FIG. 16 is a screen shot (1600) of a list of detected printing devices (110-1, 110-2, 110-n) that support data collection resulting from the discovery process of FIG. 15, according to an example of the principles described herein. As demonstrated in FIG. 16, the detected printing devices (110-1, 110-2, 110-n) may include, for example, a list of a number of supported printing devices, a number of supported printing devices that require an update, and a number unsupported printing devices. FIG. 17 is a screen shot (1700) of the data collector, when executed, updating a number of printing devices (110-1, 110-2, 110-n), according to an example of the principles described herein. Here, the data collector (FIG. 2, 340-2) updates software associated with those printing devices (110-1, 110-2, 110-n) listed in FIG. 16 as being indicated as printing devices that require an update. FIG. 18 is a screen shot (1800) of a list of detected printing devices (110-1, 110-2, 110-n) that support data collection resulting from the update process of FIG. 17. The list of printing devices (110-1, 110-2, 110-n) is a final list indicating to the user which printing devices will be supported by the data collector (FIG. 2, 340-2) and which printing devices (110-1, 110-2, 110-n) will not be supported by the data collector (FIG. 2, 340-2).

Turning again to FIGS. 1 through 3, in one example, an object device such as printing devices (110-1, 110-2, 110-n) may already be connected to the computing device (105), and a user may not wish take the time to adjust various settings and parameters of the printing devices (110-1, 110-2, 110-n) to participate in a rewards program associated with the collection of usage data. In contrast, in order to collect usage data from the printing devices (110-1, 110-2, 110-n) using a trusted association of the printing devices (110-1, 110-2, 110-n) to a network account, the identity of the printing devices (110-1, 110-2, 110-n) and the association of the printing devices (110-1, 110-2, 110-n) with the computing device (105) is established. In one example, communications originated by the printing devices (110-1, 110-2, 110-n) in response to a user's action may be used to establish such an association. In this example, the association between the printing devices (110-1, 110-2, 110-n) and the network account may be created after information regarding the printing devices (110-1, 110-2, 110-n) and the network account are received independently.

In another example, instead of or in addition to the above example of FIGS. 5 through 18 where a filename (FIG. 12, 1205) of a data collector data packet (FIG. 2, 340-2) comprises information related to a network account in the network account specific portion (FIG. 12, 1220) of the filename (FIG. 12, 1205), the information related to a network account may be embedded within the binary code of the data collector data packet (FIG. 2, 340-2). In this example, the information related to a network account may be added to the binary code of the data collector data packet (FIG. 2, 340-2) at the time the data collector data packet (FIG. 2, 340-2) is downloaded to the computing device (105). The information related to the network account is hidden from the user. Further, once trust in data collector data packet (FIG. 2, 340-2) has been established, the data collector data packet (FIG. 2, 340-2) executes autonomously and asynchronously with no user interaction.

In still another example, instead of or in addition to the above example of FIGS. 5 through 18, the data collector data packet (FIG. 2, 340-2) may present a user interface on the display device (230) of the computing device (105). The user interface prompts the user to enter information related to the network account such as, for example, a generated code. The generated code may be presented to the user during access by the user to his or her network account website. In this example, the entry of the generated code by the user associates the user's network account to the computing device (105) and the printing devices (110-1, 110-2, 110-n).

Figure 19:
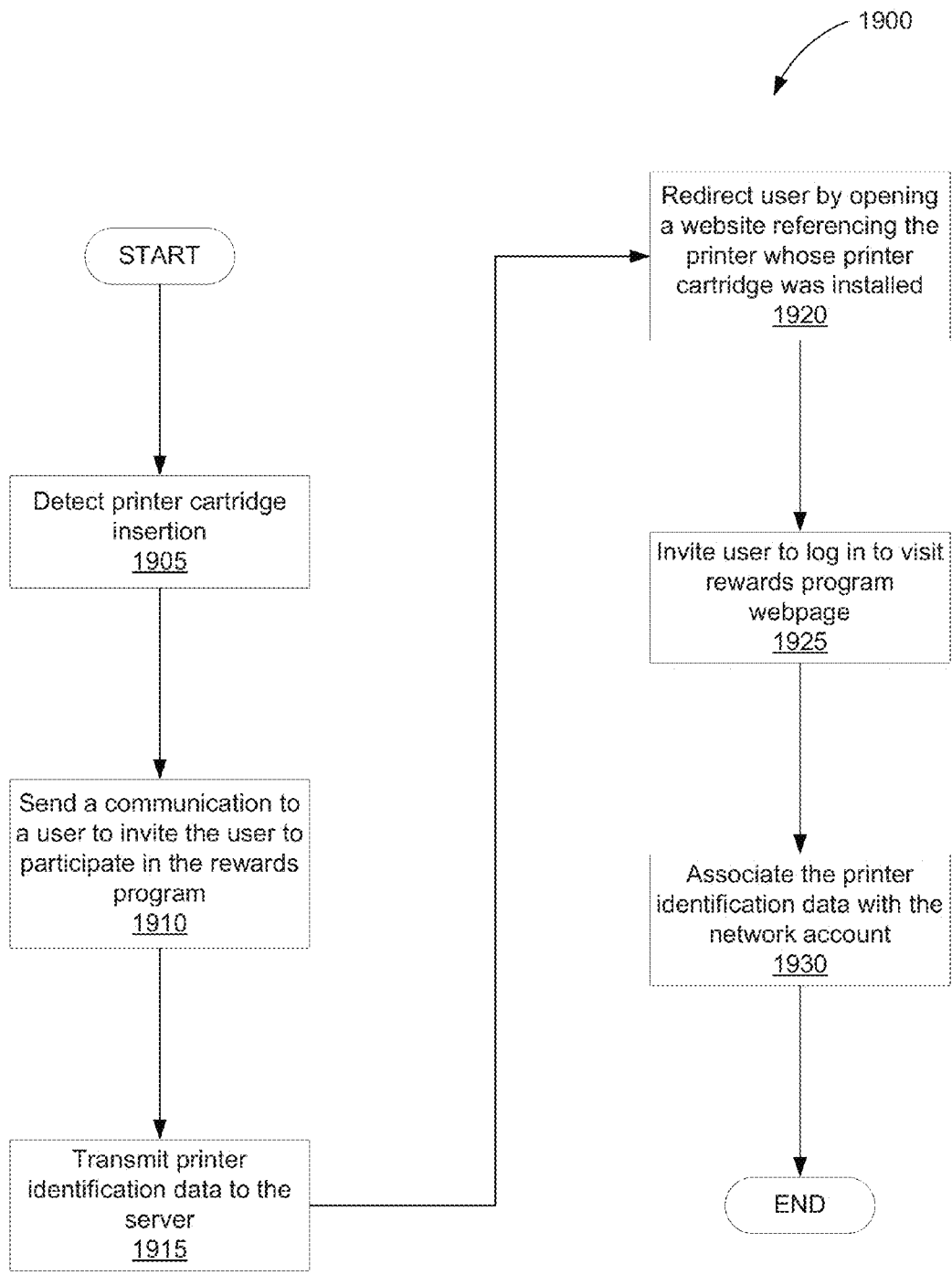
FIG. 19 is a flowchart showing a method for implementing a data collector using the data collection system, according to still another example of the principles described herein.

FIG. 19 is a flowchart showing a method (1900) for implementing a data collector using the data collection system, according to still another example of the principles described herein. The method of FIG. 19 may begin by detecting (block 1905) the insertion of a printer cartridge into a printing device (110-1, 110-2, 110-n). In one example, a printer driver stored within the data storage device (FIG. 2, 210) of the computing device (FIG. 2, 105) detects (block 1905) the insertion of the printer cartridge. In this example, the driver may be a Karnak printer driver developed by Hewlett-Packard Development Company, L.P.

A communication may be sent (block 1910) by, for example, the server (FIG. 3, 115), to the user to invite the user to participate in the rewards program. Once the user accepts the invitation, identification data of the printer whose printer cartridge was installed is transmitted (block 1915) to the server (FIG. 3, 115), and the user is redirected (block 1920) by opening a website referencing the printer whose printer cartridge was installed. The user is invited (block 1925) to log in to visit rewards program webpage. In one example, the user may not have a network account, and may be invited to create a network account.

Once logged into the rewards program webpage, the server (FIG. 3, 115) associates the printer identification data transmitted at block 1915 with the user's network account. In this manner, the affirmative action by a user such as, for example, the installation of a printer cartridge may lead to the introduction of the user to a rewards program that provides the user with incentives to share usage data regarding the printing devices (110-1, 110-2, 110-n).

Figure 20:
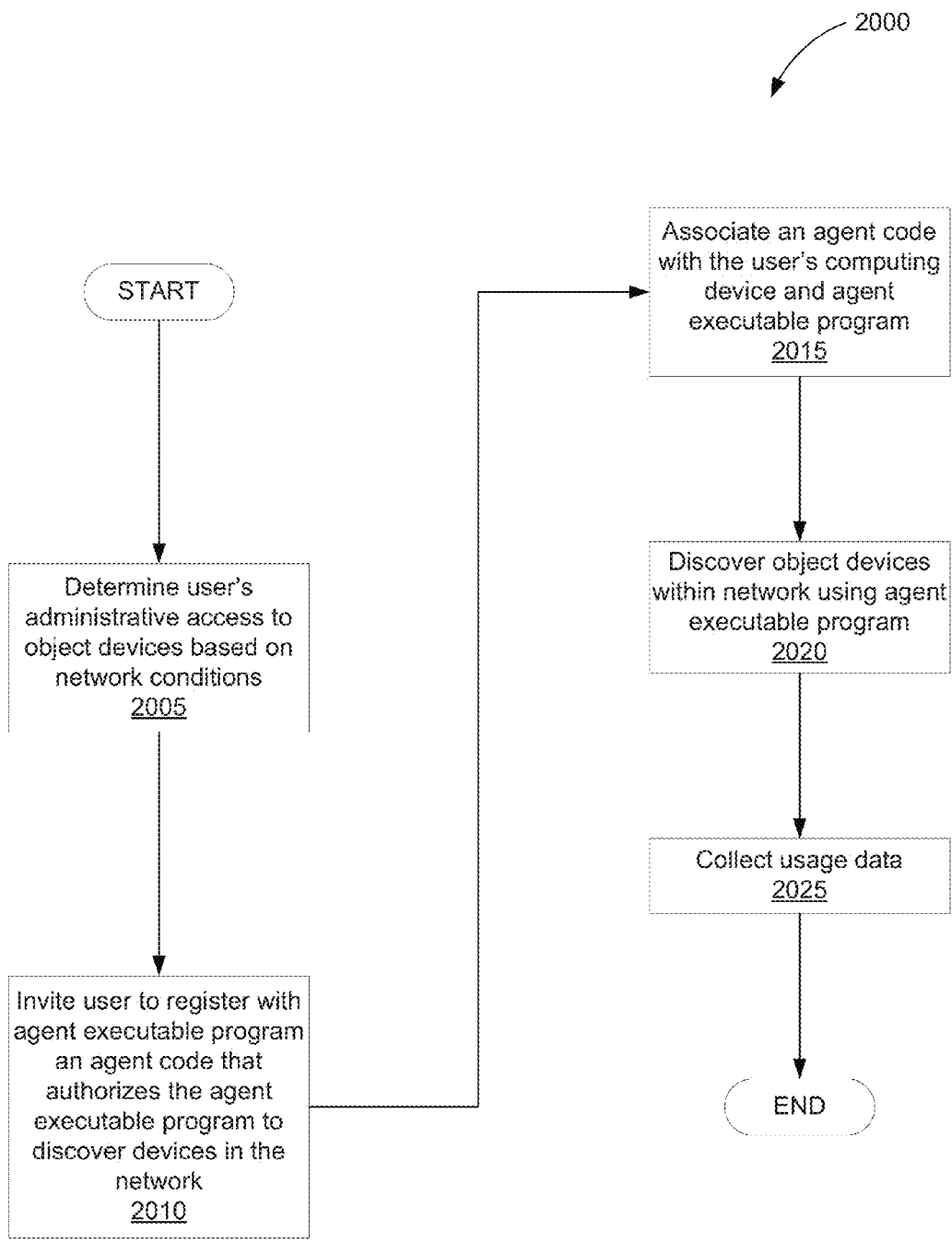
FIG. 20 is a flowchart showing a method for implementing a data collector using the data collection system, according to still another example of the principles described herein.

In another example, the user may download and register with an agent executable program that discovers printing devices (110-1, 110-2, 110-n) within the computing device's (FIG. 2, 105) network based on network conditions. FIG. 20 is a flowchart showing a method (2000) for implementing a data collector using the data collection system, according to still another example of the principles described herein. The method (2000) of FIG. 20 may begin by determining (block 2005) a user's administrative access to object devices based on a number of network conditions.

In one example, the user's administrative access to object devices such as the printing devices (110-1, 110-2, 110-n) may be based on the object devices' proximity to the user's computing device (FIG. 2, 105) within the network. The proximity of the printing devices (110-1, 110-2, 110-n) to the user's computing device (FIG. 2, 105) may be based on, for example, the number of intermediary computing devices between the printing devices (110-1, 110-2, 110-n) and the user's computing device (FIG. 2, 105), physical proximity of the to the printing devices (110-1, 110-2, 110-n) to the user's computing device (FIG. 2, 105), data transfer rates between the printing devices (110-1, 110-2, 110-n) and the user's computing device (FIG. 2, 105), similarity in network addresses between the printing devices (110-1, 110-2, 110-n) and the user's computing device (FIG. 2, 105), and combinations thereof.

In another example, the user's administrative access to object devices such as the printing devices (110-1, 110-2, 110-n) may be based on the context in which the user utilizes the computing device (FIG. 2, 105) in connection with the operation of the printing devices (110-1, 110-2, 110-n). For example, if the user is capable of changing a number of parameters within the printing devices (110-1, 110-2, 110-n), if the user can change administrative settings within the printing devices (110-1, 110-2, 110-n), or if the utilization of the printing devices (110-1, 110-2, 110-n) is exclusive to the user's computing device (FIG. 2, 105), then the system (100) may determine that the user and his or her associated computing device (FIG. 2, 105) may be used to collect usage data for the printing devices (110-1, 110-2, 110-n).

Once the user's administrative access has been established, the method (2000) may continue by inviting (block 2010) the user to register, with an agent executable program, an agent code that authorizes the agent executable program to discover devices in the network. In one example, a user may be requested to perform a user login transaction where the user logs into, generates, and registers with the agent executable program an agent code that authorizes the agent executable program to discover the printing devices (110-1, 110-2, 110-n) within the network and transmit usage data associated with the printing devices (110-1, 110-2, 110-n) to the server (FIG. 3, 115). In another example, the agent executable program may be downloaded from a web page. In this example, an authenticated user login may be tagged by, for example, a file name comprising the agent code.

Once the agent executable program has been validated by the user's computing device (FIG. 2, 205), the agent code is associated (block 2015) with the user's computing device (FIG. 2, 205) and the agent executable program. The agent executable program may act autonomously and asynchronously to discover (block 2020) the printing devices (110-1, 110-2, 110-n) within the network, and collect (block 2025) usage data associated with the use of the printing devices (110-1, 110-2, 110-n).

The methods described above may be accomplished by a computer program product comprising a computer readable storage medium having computer usable program code embodied therewith that, when executed by the processor (205) of the computing device (105), the processor (305) of the server (115), or another processing device, performs the above methods. Specifically, the computer usable program code, when executed by a processor (205, 305), causes the processor (205, 305) to create (FIG. 4, block 405) a network account based on an account enrollment request from a user, download (FIG. 4, block 410) a data collector data packet (FIG. 3, 340-1) to the user's computing device (105), and assign (FIG. 4, block 415) a filename to the data collector data packet (FIG. 3, 340-1) that comprises information related to the network account. The methods described in FIGS. 19 and 20 may be used in conjunction with or in addition to the methods of FIGS. 4 and 5.

The specification and figures describe a system (100) for associating a data collector with a network account. The system comprises a first computing device to collect data associated with the use of a number of object devices on a network, in which the first computing device creates a network account associated with a second computing device, and in which the system assigns a filename to a data collector data packet, the filename comprising information related to the network account associated with the second computing device. This system for associating a data collector with a network account may have a number of advantages, including: (1) the system creates a user-friendly environment in which users can easily setup data collector executable file that sends information to network services; (2) the system automatically determines the account associated with a data collector without user intervention; (3) the system implements in an easy manner due to the modification of a single HTTP header; (4) the system allows the data collector to be digitally signed using an offline key which enhances security; (5) the system reduces user error and abandonment by the user during the data collector installation process.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for associating a data collector with a network account comprising:
   a first computing device to collect data associated with the use of a number of object devices on a network;
   in which the first computing device creates a network account associated with a second computing device;
   in which the system assigns a filename to a data collector data packet, the filename comprising information related to the network account associated with the second computing device;
   in which the filename comprises a generic portion, and a user network account specific portion; and
   in which the user network account specific portion comprises the information related to the network account.

2. The system of claim 1, wherein the second computing device coupled to the first computing device and object devices via the network downloads the data collector data packet stored on the first computing device to the second computing device.

3. The system of claim 1, in which the first computing device is a server computer communicatively coupled to the network formed by the second computing device and object devices.

4. The system of claim 1, further comprising a firewall interposed between the first computing device and the second computing device, the firewall protecting the system from unauthorized access while permitting communications associated with usage data of the object devices.

5. A method of associating a data collector with a network account comprising:
   with a first computing device, creating a network account associated with a second computing device based on an account enrollment request from a user;
   downloading a data collector to the second computing device to collect data associated with the use of a number of object devices; and
   assigning a filename to the data collector;
   in which the filename comprises information related to the network account,
   in which the filename comprises a generic portion and a user network account specific portion, and
   in which the user network account specific portion comprises the information related to the network account.

6. The method of claim 5, further comprising transmitting instructions to a user to not change the filename of the data collector.

7. The method of claim 5, in which the filename further comprises a number of checksum values to verify that the filename is valid.

8. The method of claim 5, further comprising discovering the object devices on a network comprising the second computing device.

9. The method of claim 8, further comprising updating software associated with a number of the object devices discovered.

10. The method of claim 8, further comprising transmitting usage data associated with the use of the object devices to the first computing device communicatively coupled to the second computing device.

11. The method of claim 5, further comprising:
    with a driver stored on the second computing device, detecting consumption of a resource used by the object devices;
    with the first computing device, sending an invite to a user of the second computing device to participate in a rewards program associated with the collection of usage data.

12. A computer program product for associating a data collector with a network account, the computer program product comprising:
    a non-transitory computer readable storage medium comprising computer usable program code embodied therewith to, when executed by a processor:
    associate the data collector downloaded to a user's computing device with a number of object devices, the association comprising information related to the network account, in which the data collector collects data associated with the use of the object devices and transmits usage data regarding the use of the object devices to a server communicatively coupled to the user's computing device; and
    assign a filename to the data collector downloaded to a user's computing device, the filename comprising information related to the network account;
    in which the filename comprises a generic portion and a user network account specific portion; and
    in which the user network account specific portion comprises the information related to the network account.

13. The computer program product of claim 12, further comprising computer usable program code to, when executed by the processor, associate a number of devices with a network account via the data collector by embedding the information related to the network account within binary code of the data collector.

14. The computer program product of claim 12, further comprising computer usable program code to, when executed by the processor, associate a number of the object devices with a network account via the data collector when an action is taken by a user.

15. The computer program product of claim 12, further comprising:
    computer usable program code to, when executed by the processor, determine a user's administrative access to a number of the object devices based on network conditions; and
    computer usable program code to, when executed by the processor, associate the object devices with the network account via the data collector if it is determined the user has administrative access to the object devices.

16. The computer program product of claim 12, wherein the network conditions comprise the object devices' proximity to a user's computing device within a network, the proximity of the object devices to the user's computing device being based on a number of intermediary computing devices between the object devices and the user's computing device, a physical proximity of the object devices to the user's computing device, data transfer rates between the object devices and user's computing device, similarity in network addresses between the object devices and the user's computing device, or combinations thereof.

17. The computer program product of claim 12, wherein the network conditions comprise a context in which a user utilizes a computing device in connection with an operation of the object devices, the context comprising if the user is capable of changing a number of parameters within the object devices, if the user is capable of changing administrative settings within the object devices, or if the utilization of the object devices is exclusive to the user's computing device.

18. The computer program product of claim 17, further comprising computer usable program code to, when executed by the processor, using the computing device to collect usage data of the object devices based on the context in which the user utilizes the computing device in connection with an operation of the object devices.

\* \* \* \* \*